US006322936B1

(12) United States Patent
Nishikawa et al.

(10) Patent No.: US 6,322,936 B1
(45) Date of Patent: Nov. 27, 2001

(54) COLOR FILTER AND METHOD OF MAKING THE SAME

(75) Inventors: Takao Nishikawa, Shiojiri; Hiroshi Kiguchi; Masaru Kojima, both of Suwa, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/171,527

(22) PCT Filed: Feb. 23, 1998

(86) PCT No.: PCT/JP98/00718

§ 371 Date: Oct. 21, 1998

§ 102(e) Date: Oct. 21, 1998

(87) PCT Pub. No.: WO98/37444

PCT Pub. Date: Aug. 27, 1998

(30) Foreign Application Priority Data

Feb. 24, 1997 (JP) .................................... 9-39583
Jan. 9, 1998 (JP) .................................... 10-3551
Jan. 9, 1998 (JP) .................................... 10-3552

(51) Int. Cl.⁷ ............................ G02B 5/20; G02F 1/1335
(52) U.S. Cl. .............................................. 430/7; 427/162
(58) Field of Search ............................... 430/7; 349/106; 427/511, 162, 164

(56) References Cited

U.S. PATENT DOCUMENTS 5,952,129 * 9/1999 Kiguchi et al. ....................... 430/7
5,972,545 * 10/1999 Eid et al. ............................. 430/7

FOREIGN PATENT DOCUMENTS

| A-59-75205 | 4/1984 | (JP) . |
| A-61-245106 | 10/1986 | (JP) . |
| A-1-262502 | 10/1989 | (JP) . |
| A-3-89303 | 4/1991 | (JP) . |
| A-4-115202 | 4/1992 | (JP) . |
| A-4-324803 | 11/1992 | (JP) . |
| A-5-241011 | 9/1993 | (JP) . |
| A-5-257007 | 10/1993 | (JP) . |
| A-5-313012 | 11/1993 | (JP) . |
| A-6-167608 | 6/1994 | (JP) . |
| A-6-293122 | 10/1994 | (JP) . |
| A-7-146406 | 6/1995 | (JP) . |
| A-8-171007 | 7/1996 | (JP) . |
| A-8-220330 | 8/1996 | (JP) . |
| 9-026505 * | 1/1997 | (JP) . |
| A-10-82909 | 3/1998 | (JP) . |

* cited by examiner

Primary Examiner—John A. McPherson
(74) Attorney, Agent, or Firm—Oliff & Berridge, PLC

(57) ABSTRACT

A template (12) having a plurality of protrusions (13) in a predetermined arrangement is fabricated to facilitate the formation of ink filling concavities for forming a color pattern layer. An ink filling layer precursor (11) is attached to the template (12) and, after the ink filling layer precursor (11) has solidified to form an ink filling layer (14), the ink filling layer (14) having a plurality of ink filling concavities (15) is transfer-formed by separating the ink filling layer (14) from the template (12). Ink of previously determined colors are filled into these ink filling concavities (15) to form a color pattern layer (16).

12 Claims, 26 Drawing Sheets

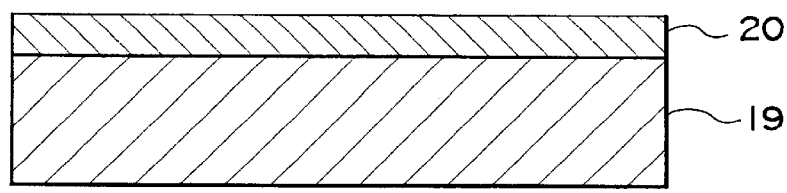
FIG. IA
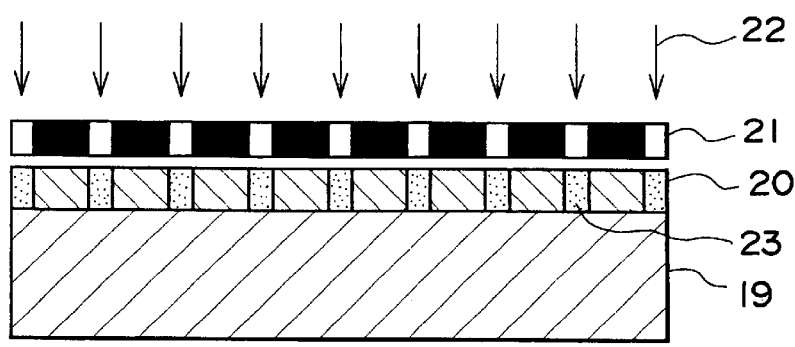
FIG. IB
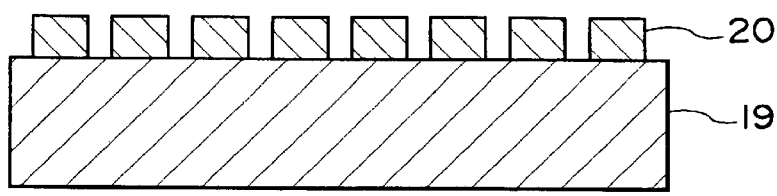
FIG. IC
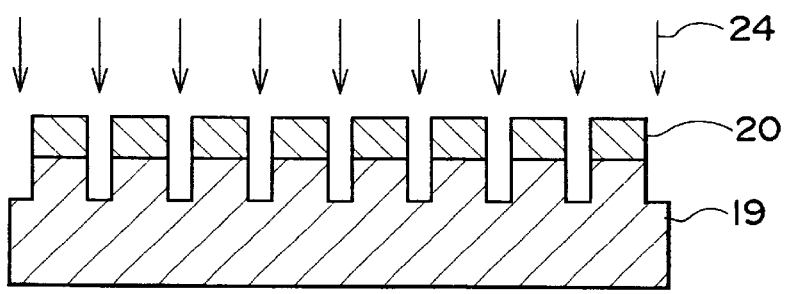
FIG. ID
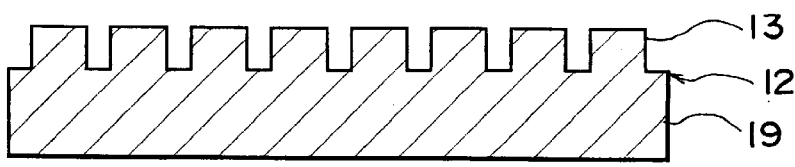
FIG. IE

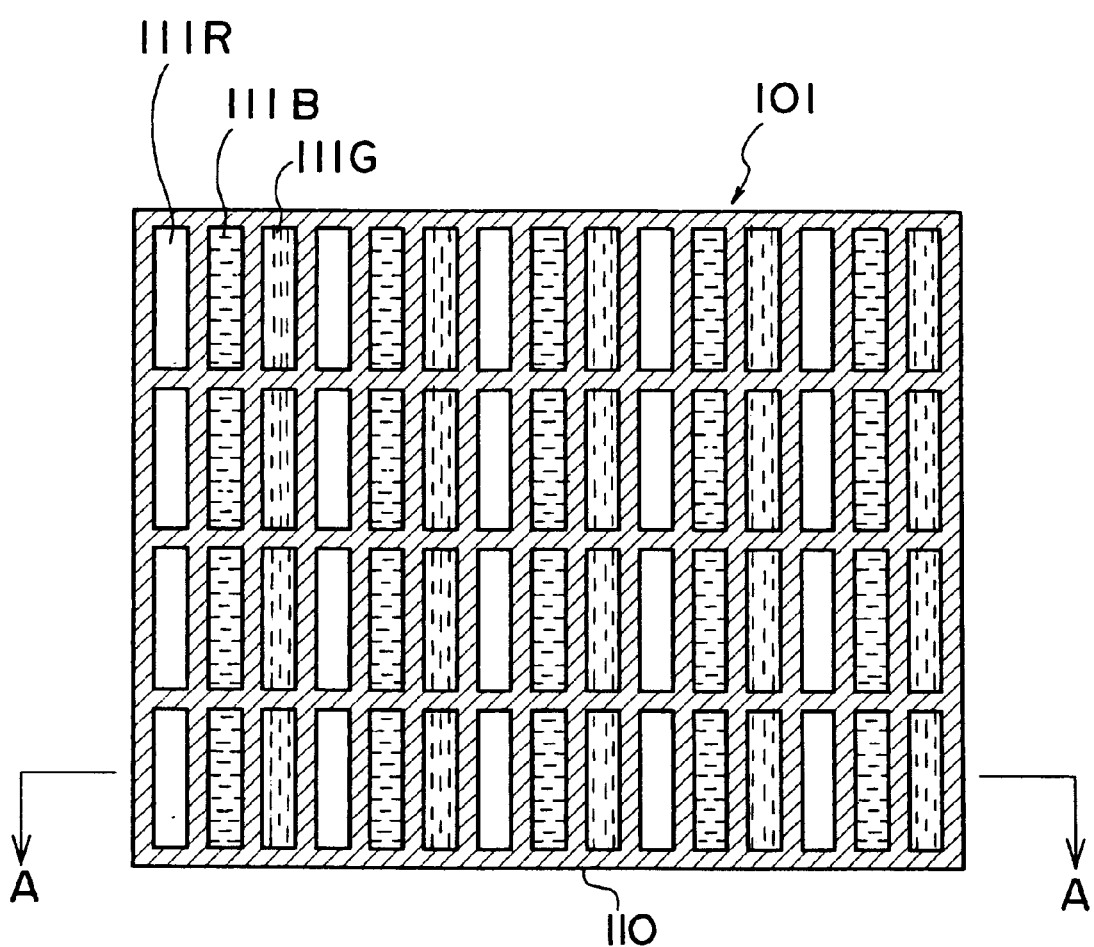

COLOR FILTER AND METHOD OF MAKING THE SAME

TECHNICAL FIELD

The present invention relates to a color filter for use in a liquid crystal display panel or the like, and a method of making the same.

BACKGROUND ART

Methods of making a color filter for a liquid crystal display panel or the like include dyeing, pigment dispersion, printing, and electrodeposition methods. Of these fabrication methods, the printing method has a drawback with respect to accuracy, and the electrodeposition method has a drawback concerning patterning restrictions, and for those reasons the dyeing method and pigment dispersion method have been most widely used in the art.

However, the dyeing method and the pigment dispersion method each require a lithography step for forming the pixel regions for each of the first color, second colors and third color, which is a big obstacle to improving the efficiency of mass producing the color filter. One method for forming pixels without such a lithography step for each color is an inkjet method of making a color filter, which is disclosed in a number of publications, such as Japanese Patent Application Laid-Open No. 59-75205 and Japanese Patent Application Laid-Open No. 61-245106. Using an inkjet method to form the color pattern improves the efficiency of use of materials and shortens the process, and it is also possible to control the formation of the color pattern and thus obtain a color filter that is inexpensive but of a high quality.

In such a method of making a color filter using an inkjet method, one means that has been proposed to prevent ink from spreading outside of each colored region, and thus implement highly precise coloring, is to use pixel delimiting regions that are formed previously by photolithography on the substrate. Ink filling concavities are thus formed on the substrate by the pixel delimiting regions, to control the shape of a color pattern that is formed by filling these ink filling concavities with ink.

These pixel delimiting regions are often formed of an opaque material so that they also function as a black matrix (hereinafter abbreviated to BM).

In this case, a high level of precision is required for the formation of the pixel delimiting regions, but it is difficult to perform such highly precise processing while improving the mass-productivity of the process. In addition, flatness is required when forming a transparent electrode on the color filter, but it has been difficult to increase the precision of this flatness in the past.

The present invention has been devised in order to solve the above problems, and has the objective of providing a method of making an inexpensive, highly precise color filter with a reduced number of steps, as well as a color filter fabricated by that method.

DISCLOSURE OF INVENTION

A method of making a color filter in accordance with the present invention comprises: a first step of fabricating a template having a plurality of protrusions in a predetermined array;

a second step of transfer-forming an ink filling layer having a plurality of ink filling concavities by causing an ink filling layer precursor to adhere to the template, solidifying the ink filling layer precursor to form the ink filling layer, then separating the ink filling layer from the template; and a third step of filling the ink filling cavities with inks of previously determined colors, to form a color pattern layer.

In other words, the present invention uses a template as a mold to transfer-form an ink filling layer having ink filling concavities. Once this template has been fabricated, it can be used a number of times limited by the durability thereof. Therefore step can be omitted from the process of forming the second and subsequent color filters, thus reducing the number of steps and the cost.

Specific methods of fabricating the template are described below.

(1) A step of forming a resist layer of a predetermined pattern on a substrate, then forming the protrusions on the substrate by etching to obtain the template.

This step makes it possible to control the shape and surface roughness of the protrusions in a highly precise and also unrestricted manner, by varying the etching conditions.

A silicon wafer is preferably used as this substrate. The technique of etching a silicon wafer is used as a technique in the fabrication of semiconductor devices, and enables highly precise processing.

(2) A step of forming a resist layer of a predetermined pattern on a base plate, then making the base plate and the resist layer conductive, and further using electrodeposition to deposit metal by an electroplating method to form a metal layer, and finally separating the metal layer from the base plate and the resist layer to obtain the template.

A metal template obtained by this step generally has superlative durability and separability.

This ink filling layer precursor is preferably a material which can be hardened by the application of energy. The use of such a material makes it possible for the material that forms the ink filling layer to easily fill as far as the most detailed parts of the concavities in the template, so that the shape of the protrusions on the template can be transferred accurately to form the ink filling concavities.

The energy is preferably at least one of light and heat. This makes it possible to use a general-purpose exposure apparatus, baking oven, or hotplate, enabling reductions in equipment costs and installation space.

A resin which is hardened by ultraviolet rays is an example of such a material. An acrylic resin has superlative transparency as a resin which is hardened by ultraviolet rays, and it is suitable because various commercially available resins and photosensitive materials can be used therefor.

Next, the ink is preferably injected by an inkjet method in the third step. The use of an inkjet method enables rapid application of the ink and there is also no waste of such ink.

In a further aspect of the present invention, an opaque material may be injected into concavities between the protrusions the template after the first step but before the second step, to form an opaque layer; and the opaque layer is integrated with the ink filling layer in the second step, by using the template on which is formed the opaque layer.

This opaque material may also be injected by an inkjet method.

The inner side surfaces of the concavities of the template may be formed in a tapered shape in such a manner that the surface area of aperture portions thereof are larger than base surfaces thereof.

These concavities of the template may also be formed in a tapered shape at aperture edge portions of inner side surfaces thereof.

If the concavities are formed in a tapered shape in this manner, the inks can be guided reliably into the concavities, thus making the color filter particularly suitable for use in a high-resolution liquid crystal panel. In addition, this configuration reduces any difference in thickness of the color pattern layer, thus reducing unevenness in color caused by factors such as differences in color tone or brightness, and thus making it possible to fabricate a color filter that provides a bright image.

Another method of making a color filter in accordance with the present invention comprises: a first step of forming a plurality of colored layers;

a second step of placing a precursor of a protective film on the colored layers; and a third step of forming a protective film precursor layer by flattening a surface of the protective film precursor with a template having a flat surface corresponding to at least an optically transparent region (filter element) of the colored layers, then hardening the protective film precursor layer to form a protective film. This method makes it possible to form the surface of the protective film to be flat.

With the present invention, at least one concavity could be provided in a surface of the template corresponding to a region other than an optically transparent region of the colored layers;

the shape of the concavities of the template is transferred to the protective film precursor layer in the third step, to form protrusions in the protective film corresponding to the concavities, and the protrusions act as support members (spacer) for maintaining a constant spacing (cell gap) for injecting liquid crystal into a liquid crystal panel (liquid crystal cell). This method makes it possible to form support members simultaneously with the protective film, and also easily adjust the positions at which the support members are disposed.

In this aspect of the invention, the second step could cause the concavities of the template to be positioned above and between the colored layers.

This forms support members between the colored layers. In addition, if an opaque layer (black matrix) is formed between the colored layers, protrusions that act as support members could be positioned on top of this opaque layer. For example, the opaque layer could be formed as a lattice, with the support members formed at intersection points of this lattice. Since this method makes it possible to not form support members on the colored layers, it enables an improvement in yield and also simplifies the fabrication process.

The concavities could also be formed in a circular cylindrical shape. This causes the protrusions that act as support members to have a circular cylindrical shape, making it possible to suppress disturbances in the orientation of the liquid crystal and increase the contrast of the liquid crystal panel display.

It is preferable that the protective film precursor is a material which can be hardened by the application of-energy. This energy may be at least one of light and heat, for example. The protective film precursor could be a resin which is hardened by ultraviolet rays.

With this aspect of the invention, a transparent electrode film could be previously formed on the template; and after the transparent electrode film is placed in contact with the protective film precursor, the protective film precursor layer is formed by the template, and the protective film precursor is hardened to form a protective film in the third step, the template is separated from the protective film precursor layer, leaving the transparent electrode remaining on the protective film precursor layer. This makes it possible to form the transparent electrode film in a simple manner.

A separation layer could also be formed between the template and the transparent electrode film, to promote the separation of the two components. This facilitates the removal of the template from the protective film precursor, leaving the transparent electrode film.

A color filter in accordance with the present invention comprises an ink filling layer having a plurality of ink filling concavities; and a color pattern layer formed in the ink filling cavities; and wherein the ink filling layer is formed by causing a template having a plurality of protrusions in a predetermined array to adhere to an ink filling layer precursor, then solidifying the ink filling layer precursor.

Another color filter in accordance with the present invention comprises a plurality of colored layers; and a protective film formed on the colored layers; and wherein the protective film is formed by flattening a surface of the protective film precursor with a template having a flat surface corresponding to at least an optically transparent region of the colored layers, then hardening the protective film precursor layer.

BRIEF DESCRIPTION OF DRAWINGS

FIGS. 1A to 1E illustrate the process of making a template of a first embodiment of the present invention;

FIG. 6 is a plan view of a color filter made in accordance with a third embodiment of the present invention;

BEST MODE FOR CARRYING OUT THE INVENTION

Figure 2A:
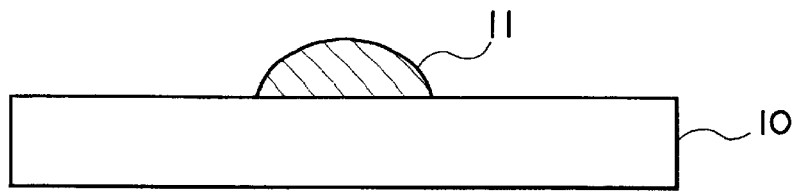
FIGS. 2A to 2E illustrate the process of making a color filter of the present embodiment of the invention.

Preferred embodiment of the present invention are described below with reference to the accompanying drawings.

First Embodiment

The process of making a template of a first embodiment of the present invention is shown in FIGS. 1A to 1E. This method is described in detail below.

First of all, as shown in FIG. 1A, a resist layer 20 is formed on a substrate 19.

The surface of the substrate 19 will be etched to form a template, and a silicon wafer is used in this case. The technology of etching a silicon wafer is established in the art of making semiconductor devices and enables highly precise etching to be carried out. It should be noted that as long as the substrate 19 is of a material which can be etched, it is not restricted to being a silicon wafer, and for example a plate or film of glass, quartz, resin, metal, ceramic, or other material may be used therefor.

As the material forming the resist layer 20, it is possible to use a commercially available positive resist such as that generally used in the fabrication of semiconductor devices, being a cresol novolac type resin to which a diazonaphthoquinone derivative is added as a photosensitive material. Here, positive resist refers to a substance which can be selectively removed by developer in an area which is exposed to radiation in accordance with a predetermined pattern.

As the method of forming the resist layer 20, it is possible to use a spin-coating, dipping, spray-coating, roll-coating, or bar-coating method, for example.

Next, as shown in FIG. 1B, a mask 21 is disposed on the resist layer 20, and selected regions only of the resist layer are exposed through the mask 21 to radiation 22 to form radiation-exposed regions 23.

The mask 21 is patterned so as to pass the radiation 22 only in those regions that do not correspond to protrusions 13 shown in FIG. 1E.

These protrusions 13 are intended to function as a means of transferring ink filling concavities 15 for forming each color pattern layer 16 (see FIG. 2E) for the color filter being fabricated, and are formed to correspond to the form and layout of the color pattern layer 16. For a 10-inch VGA type of liquid crystal panel, for example, approximately 900,000 pixels (for 640×480×3 colors), or in other words approximately 900,000 protrusions 13, are formed at a pitch of approximately 100 μm on the template.

Light of a wavelength in the region of 200 nm to 500 nm is preferably used as this radiation. The use of light in this wavelength region makes it Possible to utilize photolithography techniques and the equipment therefor that have been established for the process of manufacturing liquid crystal panels or the like, thus reducing costs.

After the resist layer 20 has been exposed to the radiation 22, developing is carried out under predetermined conditions, and, as shown in FIG. 1C, the resist in the radiation-exposed regions 23 only is selectively removed, exposing the substrate 19, while other regions remain covered by the resist layer 20.

When the resist layer 20 is patterned in this way, as shown in FIG. 1D, with the resist layer 20 as a mask, the substrate 19 is etched to a particular depth.

The method of etching may be wet etching or dry etching, but, depending on the material of the substrate 19, the method of etching and the conditions may be chosen to be optimum from a consideration of the cross-sectional shape of the etching, the etching rate, surface uniformity, and so forth. For controllability, a dry method is superior, and a device using a parallel flat plate reactive ion etching (RIE) method, inductive coupled plasma (ICP) method, electron cyclotron resonance (ECR) method, helicon wave excitation method, magnetron method, plasma etching method, ion beam etching method, or the like may be used, by way of example, and, by varying the type of etching gas, the gas flow rate, the gas pressure, the bias voltage, and other conditions, the protrusions 13 may be formed in an rectangular shape, a taper may be applied, or the surface may De made rough, to obtain any desired etching shape.

Next, after etching is completed, the resist layer 24 is removed as shown in FIG. 1E, and the substrate 19 having the protrusions 13 is obtained, and this forms a template 12. The processing after the template 12 is obtained is shown in FIGS. 2A to 2E.

First of all, a reinforcing plate 10 is attached to the template 12 with an ink filling layer precursor 11 therebetween.

A glass substrate is generally used as the reinforcing plate 10, but it is not specifically limited thereto provided it can satisfy conditions such as optical transmissivity and mechanical strength that are required of a color filter. The reinforcing plate 10 may, for example, be a plate or film of a plastic material such as a polycarbonate, polyarylate, polyether sulfone, amorphous polyolefin, polyethylene terephthalate, or polymethyl methacrylate.

Figure 2B:
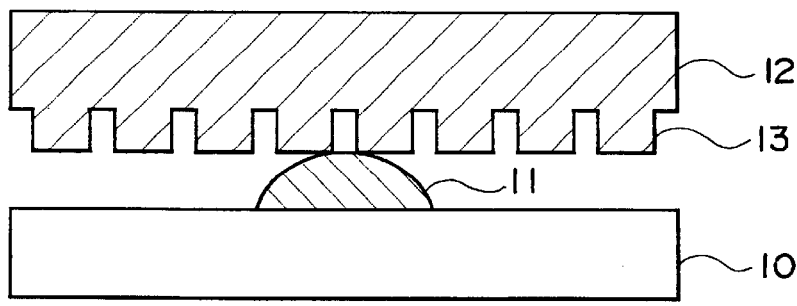
Figure 2C:
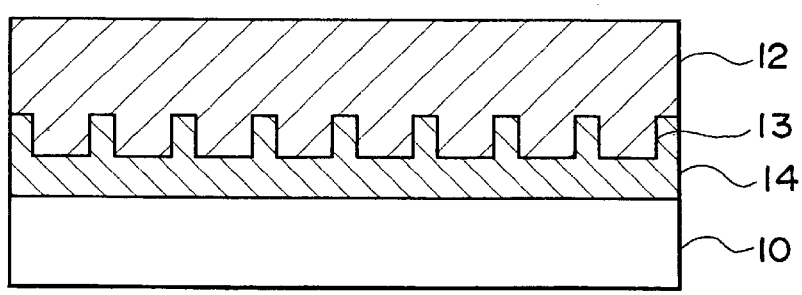
Figure 2D:
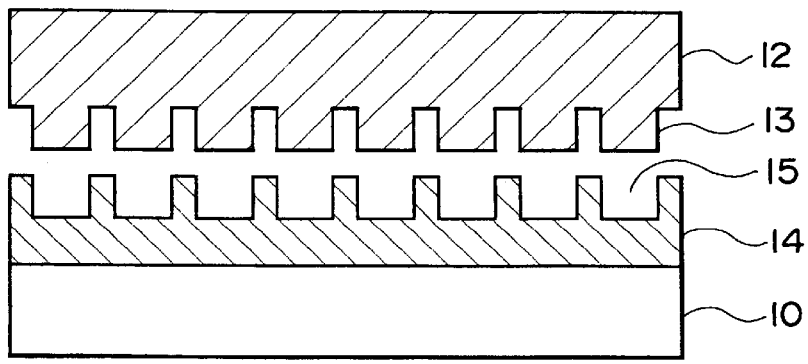
Figure 2E:
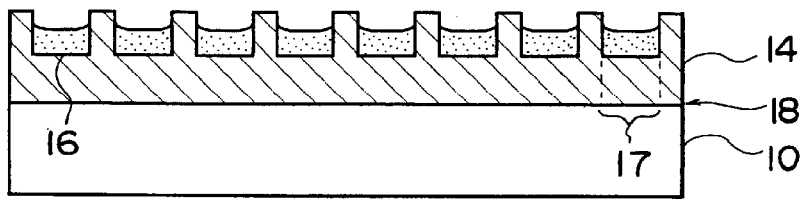

The ink filling layer precursor 11 is not particularly limited, provided it has sufficient optical transmissivity such that the color characteristics of the color pattern layer 16 are not lost at the thickness of color pattern layer formation regions 17 shown in FIG. 2E, and various materials may be used therefor, but it is preferable that a material that can be hardened by the application of energy is used. Such a material can be handled as a low-viscosity liquid during the formation of a ink filling layer 14, and can readily flow into the most detailed portions of concavities formed between the template 12 and the protrusions 13 at a normal temperature and a normal pressure.

The energy applied thereto is preferably at least one of light and heat. This makes it possible to use a general-purpose exposure apparatus, baking oven, or hotplate, enabling reductions in equipment costs and installation space.

An example of this material is a resin which is hardened by ultraviolet rays. Acrylic resins are suitable examples of such resins that are hardened by ultraviolet rays. The use of various commercially available resins and photosensitive materials makes it possible to obtain an acrylic resin which has superlative transparency and which can also be hardened by a short application of ultraviolet rays.

As specific instances of the basic composition of acrylic to resins hardened by ultraviolet rays may be cited prepolymers, oligomers, monomers, and optical polymerization initiators.

As prepolymers or oligomers may be used, for example, acrylate-based substances such as epoxy acrylates, urethane acrylates, polyester acrylates, polyether acrylates, and spiroacetal acrylates; or methacrylate-based substances such as epoxy methacrylates, urethane methacrylates, polyester methacrylates, and polyether methacrylates.

As monomers may be used, for example, monofunctional monomers such as 2-ethylhexyl acrylate, 2-ethylhexyl methacrylate, 2-hydroxyethyl acrylate, 2-hydroxyethyl methacrylate, N-vinyl-2-pyrrolidone, carbitol acrylate, tetrahydrofurfuryl acrylate, isobornyl acrylate, dicyclopentenyl acrylate, and 1,3-butanediol acrylate; bifunctional monomers such as 1,6-hexanediol diacrylate, 1,6-hexanediol dimethacrylate, neopentylglycol diacrylate, neopentylglycol dimethacrylate, ethylene glycol diacrylate, polyethylene glycol diacrylate, and pentaerythritol diacrylate; and polyfunctional monomers such as trimethylol propane acrylate, trimethylol propanetri methacrylate, pentaerythritol triacrylate, and dipentaerythritol hexacrylate.

As optical polymerization initiators may be used, for example, acetophenones such as 2,2-dimethoxy-2-phenylacetophenone; butylphenones such as α-hydroxyisobutylphenone and p-isopropyl-α-hydroxyisobutylphenone; halogenated acetophenones such as p-tert-butyldichloroacetophenone, p-tert-butyltrichloroacetophenone, and α,α-dichloro-4-phenoxyacetophenone; benzophenone compounds such as benzophenone and N,N-tetraethyl-4,4-diaminobenzophenone; benzyl compounds such as benzyl and benzyl dimethyl ketals; benzoin compounds such as benzoin and benzoin alkylethers; oxime compounds such as 1-phenyl-1,2-propanedion-2-(o-ethoxycarbonyl)oxime; xanthone compounds such as 2-methylthioxanthone and 2-chlorothioxanthone; benzoin ethers such as benzoin ether and isobutyl benzoin ether; and radical generating compounds such as Michler's ketone.

It should be noted that, if necessary to prevent impairment of hardening by oxygen, amines or other compounds may be added, and, to facilitate the painting a solvent ingredient may be added.

There is no particular restriction on the solvent ingredient added, and various organic solvents may be used either singly or in combination, such as, for example, propylene glycol monomethyl ether acetate, propylene glycol monomethyl ether, methoxy methyl proprionate, ethyl cellosolve, ethyl cellosolve acetate, ethyl lactate, ethyl pyruvinate, ethyl amyl ketone, cyclohexanone, xylene, toluene, or butyl acetate.

A predetermined amount of the ink filling layer precursor 11, consisting of such an acrylic resin hardened by ultraviolet rays or the like, is dropped onto the reinforcing plate 10, as shown in FIG. 2A.

The template 12 is then pressed onto the reinforcing plate 10 with the ink filling layer precursor 11 therebetween, as shown in FIG. 2B, and, after the ink filling layer precursor 11 has spread over a predetermined region, ultraviolet rays are shone thereon from the reinforcing plate 10 side for a predetermined time to harden the ink filling layer precursor 11 and thus form the ink filling layer 14 between the reinforcing plate 10 and the template 12, as shown in FIG. 2C.

To ensure that the ink filling layer precursor 11 spreads over the predetermined region, a predetermined pressure may be applied to the template 12 if necessary.

In the above case, the ink filling layer precursor 11 is dropped onto the reinforcing plate 10, but it may equally well be dropped onto the template 12 or onto both the reinforcing plate 10 and the template 12.

Alternatively, the ink filling layer precursor 11 may be applied over one or both of the reinforcing plate 10 and the template 12 by using a spin-coating method, dipping method, spray-coating method, roll-coating method, bar-coating method, or the like.

The reinforcing plate 10 and the ink filling layer 14 are then removed from the template 12 as an integral unit, as shown in FIG. 2D, to obtain the reinforcing plate 10 an which is formed ink filling layer 14 having the ink filling concavities 15 in the surface thereof.

After the ink filling concavities 15 is thus formed on the reinforcing plate 10, each of the ink filling concavities 15 is filled with a predetermined colored ink as shown in FIG. 2E, to form the color pattern layer 16.

There are no particular restrictions on the method used to fill the ink filling concavities 15 with colored inks, but an inkjet method is preferred. With an inkjet method, the practical technology that has been developed for inkjet printers can be employed, enabling the filling operation to be carried out rapidly and economically, with no ink waste.

Figure 3:
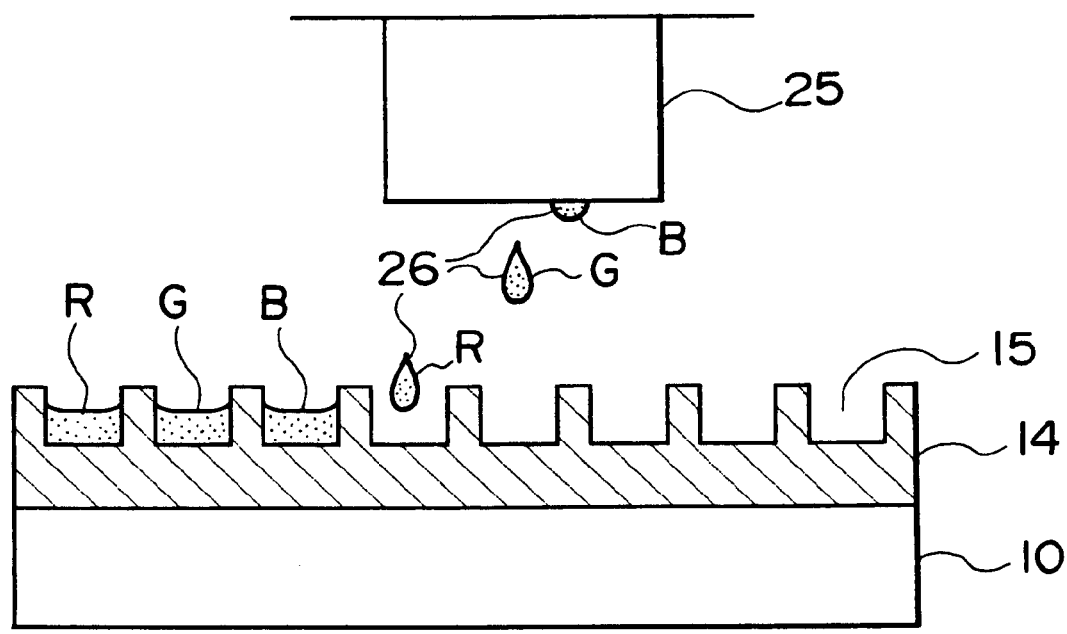
FIG. 3 illustrates the process of making a color pattern layer of the present embodiment of the invention.

FIG. 3 shows the ink filling concavities 15 being filled with inks 26, such as red ink R, green ink G, and blue ink B, by an inkjet head 25.

The head 25 is disposed facing the ink filling concavities 15 on the reinforcing plate 10, and the colored inks 26 are ejected into the Ink filling concavities 15 by the head 25.

The head 25 is for example one developed for an inkjet printer, and may for example be a Piezo Jet Type employing a piezoelectric element, or a Bubble Jet Type employing electrothermal conversion as an energy producing element, and the color areas and color pattern can be determined as required.

For example, if the head 25 has twenty ink-ejecting nozzles for each of R, G, and B, and a drive frequency of 14.4 kHz (14400 ejection cycles per second), then if three drops of ink are ejected into each of the ink filling concavities 29, to eject ink into the ink filling concavities 15 of a 10-inch VGA type of color filter having approximately 900,000 pixels, the time required is:

900,000×3 drops/(144000 cycles×20 nozzles×3 colors)=approximately 3 seconds

In this case, even when the time for the head 25 to move from one ink filling concavity 15 to the next is included, all of the ink filling concavities 15 can be filled with the colored inks 26 in about 2 or 3 seconds.

The inclusion of a solvent component in the colored inks 26 ensures that the solvent of the ink is evaporated by thermal processing.

In this way, as shown in FIG. 2E, the color pattern layer 16 is formed on the reinforcing plate 10, to obtain the completed product 18 of a color filter.

In the above embodiment, a positive resist is used when the protrusions 13 are formed on the template 12, but equally a negative resist, such that regions exposed to radiation are rendered insoluble in a developer, and the regions not exposed to radiation are selectively removed by the developer, may be used; in that case, the mask used has a pattern which is the inverse of the pattern of the mask 21. Alternatively, instead of using a mask, a laser beam or electron beam may be used to directly expose the resist in a pattern.

Second Embodiment

The process of fabricating a template of a second embodiment of the present invention is shown in FIGS. 4A to 5C.

Figure 4A:
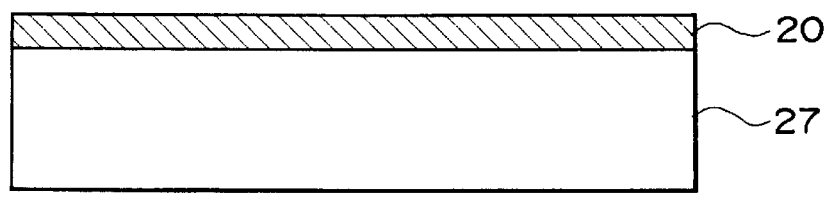
FIGS. 4A to 4C illustrate the process of fabricating a template of a second embodiment of the present invention.

First, as shown in FIG. 4A, the resist layer 20 formed on a base plate 27.

The base plate 27 is not restricted as long as it can fulfill the role of a support during the patterning of the resist layer 20 by lithography, it has properties such as the mechanical strength and chemical resistance necessary for the processing, and it has good wettability and adhesiveness with respect to the material forming the resist layer 20; for example, a substrate of glass, quartz, resin, silicon wafer, metal, ceramic, or other material may be used as the base plate 27. A glass template is used in this case, with the surface thereof being polished to a flat using a cerium oxide type of polishing agent, then washed and dried.

Since the material and method used for forming the resist layer 20 can be the same as those described with reference to the first embodiment, further description thereof is omitted.

Figure 4B:
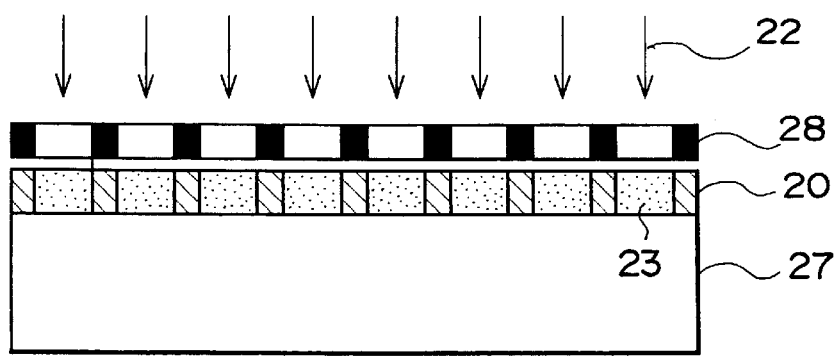

Next, as shown in FIG. 4B, a mask 28 is disposed on the resist layer 20 and predetermined regions only of the resist layer 20 are exposed through the mask 28 to the radiation 22 to form the radiation-exposed regions 23.

Figure 4C:
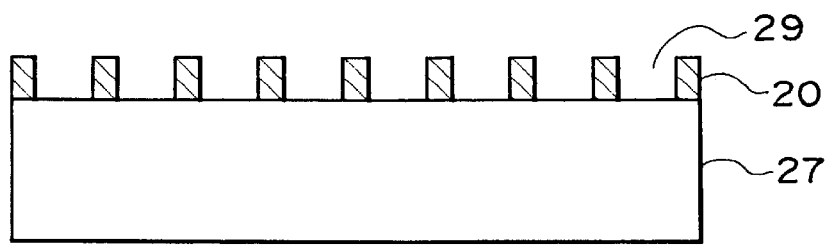

The mask 28 is formed in a pattern such that the radiation 22 passes only through regions corresponding to the concavities 29, as shown in FIG. 4C.

The concavities 29 act as indentations for forming the protrusions 13 of the template 12 (see FIG. 1E). The protrusions 13 of the template 12 are designed as a transfer formation for the ink filling concavities 15 (see FIG. 2D) for forming the color pattern layer 16 of the color filter (see FIG. 2E). Therefore, the concavities 29 have the same shape and arrangement as the ink filling concavities 15, in other words, they are formed to correspond to the shape and arrangement of the color pattern layer 16 of the color filter to be fabricated.

Light of a wavelength in the region of 200 nm to 500 nm is preferably used as this radiation. The use of light in this wavelength region makes it possible to utilize photolithography techniques and the equipment therefor that have been established for the process of manufacturing liquid crystal panels or the like, thus reducing costs.

If development is performed under predetermined conditions after the exposure to the radiation 22, only the resist on the radiation-exposed regions 23 is selectively removed, as shown in FIG. 4C, to pattern the resist layer 20 and thus form the concavities 29 on top of the base plate 27.

Figure 5A:
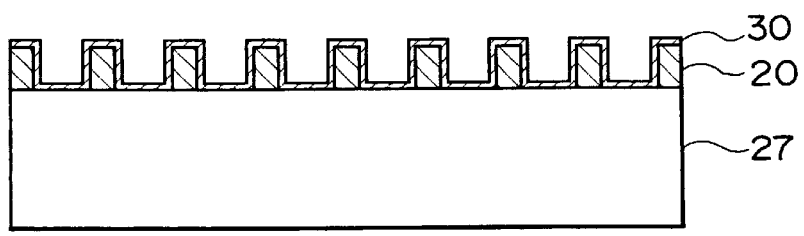
FIGS. 5A to 5C illustrate the rest of the process of fabricating the template of the second embodiment of the present invention.

Next, a conductive layer 30 is formed on the resist layer 20 and the base plate 27 as shown in FIG. 5A, to make the surfaces thereof conductive.

As the conductive layer 30, Ni formed to a thickness of 500 to 1000 Angstroms ($10^{-10}$ m) may be used, for example. The method of forming the conductive layer 30 may be a method such as sputtering, CVD, vapor deposition, or non-electrolytic plating.

Figure 5B:
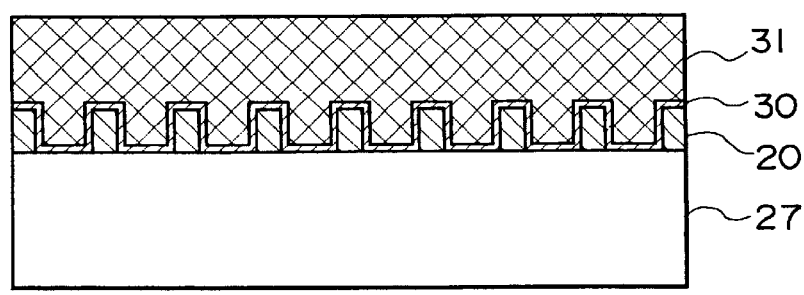

Then, using the base plate 27 and the resist layer 20, which have been made conductive by the conductive layer 30, as the cathode and a tip-shaped or ball-shaped Ni as the anode, electroplating is further carried out to electrically deposit Ni to make a metal layer 31, as shown in FIG. 5B.

The following is a specific example of the electrolyte that may be used:

| Nickel sulfamate: | 900 g/l |
| Boric acid: | 60 g/l |
| Nickel chloride: | 8 g/l |
| Leveling agent: | 30 mg/l |

Figure 5C:
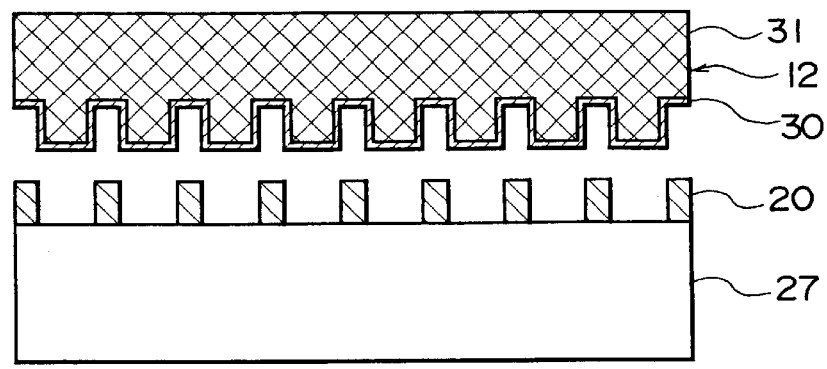

Next, the conductive layer 30 and the metal layer 31 are separated from the base plate 27, as shown in FIG. 5C, and are washed if necessary, to form the template 12.

Note that the conductive layer 30 may be removed from the metal layer 31 by performing separating processing, if necessary.

Once the template 12 is obtained in this manner, the color filter can then be obtained by the steps shown in FIG. 2.

In the present embodiment too, a negative resist may also be used, in which case a mask having a pattern that is the inverse of the mask 28 may be used, in other words, a mask that is the same as the mask 21 of FIG. 1B. Alternatively, no mask is used and the resist is exposed directly in a pattern by laser light or an electron beam.

Once the template 12 has been fabricated by the above described method of making a color filter, it can be used a number of times limited only by its endurance to fabricate two or more color filters, thus reducing the number of steps and the cost.

A BM or over-coating layer is subsequently formed on top of the color pattern layer 16 if necessary, a transparent electrode and an orientation film are attached thereto, and it is installed into an array.

Third Embodiment

A third embodiment of the present invention is intended to fabricate a color filter by a small number of steps, whereby an opaque layer, in other words, a black matrix is formed by providing ink filling layers after a template has been filled with an opaque material.

Color Filter Fabrication

A plan view of a color filter fabricated by the method of the present invention is shown in FIG. 6. As shown in this figure, a color filter 101 of the present invention is provided with color pattern layers 111R, 111G, and 111B within pixel aperture portions that are separated by an opaque layer 115 formed on an ink filling layer 110.

The ink filling layer 110 may be formed of a material such as resin, for example, with the opaque layer 115 (see FIG. 10) that is formed of an opaque material being provided on a surface thereof (the surface that can be seen in FIG. 6).

The color pattern layers 111R, 111G, and 111B combine color pattern layers of a plurality of primary colors to form individual color pixels. In the present embodiment, pixels of a color pattern layer (red) 111R, a color pattern layer (green) 111G, and a color pattern layer (blue) 111B are arrayed to form individual color pixels, to form color pixels from the three primary colors of red, green, and blue. The color pixels in this figure are shown as an array of five columns by four rows, to simplify the description, but the pixel arrangement in a real-life product will match the resolution of the liquid crystal panel.

These color pattern layers 111R, 111G, and 111B are formed by injecting colored inks that are transparent. The pixels are arrayed at a pitch of for example, approximately 100 μm.

Note that the arrangement of pixels and the pattern of the ink filling layer 110 are not limited to those shown in FIG.

6; they can be implemented in various different forms corresponding to the pixel array of the liquid crystal panel.

If a color filter of the above described configuration is installed in a liquid crystal panel, light from each pixel of the liquid crystal panel will pass through and shine from one of the color pattern layers 111R, 111G, and 111B. A color display is achieved by attaching the color filter to a liquid crystal panel with the colors of the color pattern layers 111R, 111G, and 111B in the color filter placed in correspondence with the color disposition of pixels in the liquid crystal panel.

Fabrication Method

The method of making a color filter in accordance with the present embodiment will now be described with reference to FIGS. 7A to 10. These figures are schematic cross-sectional views of the fabrication process, taken along the line A—A of FIG. 6.

Template Fabrication

When it comes to fabricating the color filter of the present invention, a template used for transferring the shape of the color pattern layers of the color filter is first formed. FIGS. 7A to 7E are cross-sectional views of the fabrication process, illustrating the method of fabricating the template.

Figure 7A:
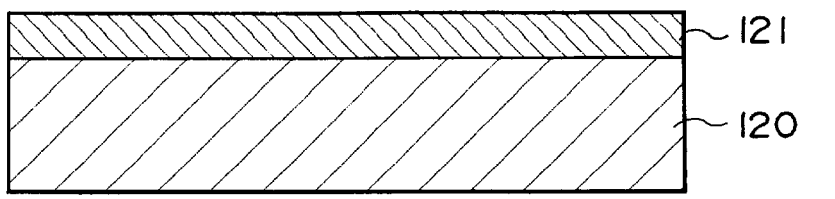
FIGS. 7A to 7E illustrate the process of fabricating a template of a third embodiment.

Resist Layer Formation Step (FIG. 7A)

In a resist layer formation step, a resist layer 121 is formed on a substrate 120. Silicon or quartz is preferably used as the material of the substrate 120.

Of resist materials used to configure the resist layer 121, a negative material is one that is converted into a hard film that is made not soluble in a developer by illuminating it with light of at least a certain strength, and a positive material is one that is made readily soluble to a developer by illuminating it with light of at least a certain strength. A positive resist material is used in the present embodiment.

The method used for making the resist layer 121 is not particularly limited. For example, a resist material could be coated to a thickness of approximately 1 μm on the substrate 120 by a spin-coating method, then it is fixed by thermal processing to form the resist layer 121.

Figure 7B:
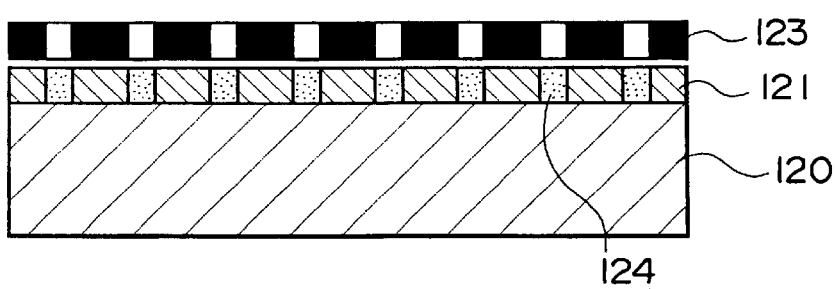

Exposure Step (FIG. 7B)

In an exposure step, the resist layer 121 is covered with a mask 123 in accordance with a predetermined pattern, then light 122 is shone thereon to expose the resist.

The mask 123 is a screening member that is patterned in such a manner that the light 122 passes therethrough only in regions corresponding to light-exposed regions 124. This pattern is formed in the shape of the ink filling layer 110 that separates the pixels of the color filter 101.

Figure 7C:
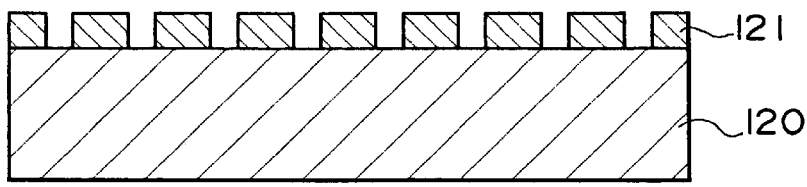

Development Step (FIG. 7C)

In a development step, the resist material is removed from the light-exposed regions 124 by development performed under fixed conditions, after the resist layer 121 has been exposed by the light 122. This processing selectively removes the resist material from the light-exposed regions 124 that had been exposed to the light 122, to reveal the substrate 120.

Figure 7D:
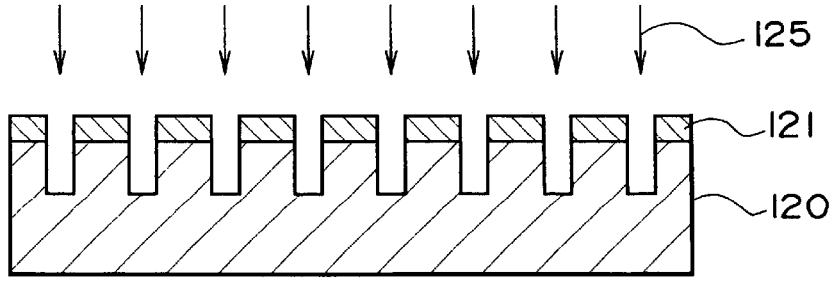

Etching Step (FIG. 7D)

In an etching step, concavities 114 are formed in the shape of the ink filling layer 110, by etching the patterned resist layer 121 with an etchant 125.

A wet method or a dry method could be used as the etching method. The optimal method and etching conditions are selected to suit the material properties of the substrate 120 from the viewpoints of factors such as etching cross-sectional shape, etching rate, and surface uniformity. If control over etching depth and shape is important, a dry method is superior.

Figure 7E:
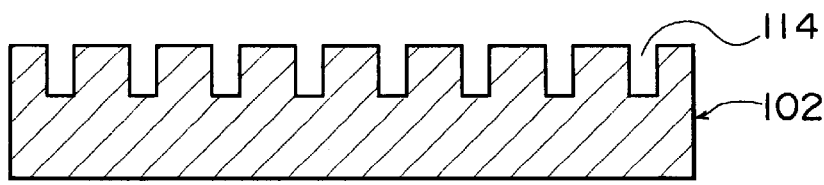

Removal Step (FIG. 7E)

In a removal step the resist layer 121 is removed from the substrate 120 after the etching. The concavities 114 corresponding to the pattern shape of the mask 123 have been formed in the substrate 120 once the resist layer 121 has been removed. In other words, the substrate 120 becomes a template 102.

Color Filter Fabrication

The description now turns to the method of fabricating a color filter using the template 102 formed as described above, with reference to FIGS. 8A to 8D.

Figure 8A:
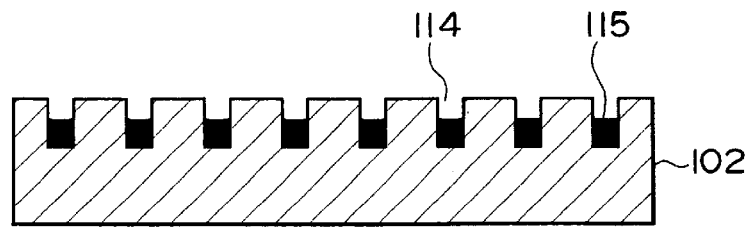
FIGS. 8A to 8D illustrate the process of fabricating a color filter of the present invention.

Opaque Layer Formation Step (FIG. 8A)

In a opaque layer formation step, the concavities 114 of the template 102 are filled with an opaque material to form the opaque layer 115 that acts as a black matrix. The opaque material could be any of various different materials, provided it is not optically transmissive and it is durable- For example, a black resin such as negative resin black produced by Fuji Hanto, resist HRB-#01 for highly insulating black matrices produced by Toppan Printing Co., Ltd., or resin black produced by Japan synthetic Rubber (JSR) Co., Ltd. could be used dissolved in an organic solvent. In the present embodiment, ink is ejected from an inkjet type of recording head, so it is necessary to ensure the liquidity of the opaque material to a certain extent. The type of organic solvent is not particularly limited, so various different organic solvents could be used. For example, propylene glycol monomethyl ether acetate, propylene glycol monopropyl ether, methoxy methyl proprionate, methoxy ethyl proprionate, ethyl cellosolve, ethyl cellosolve acetate, ethyl lactate, ethyl pyruvinate, methyl amyl ketone, cyclohexanone, xylene, toluene, or butyl acetate could be used therefor, either singly on in a combination of a plurality of substances.

Figure 9:
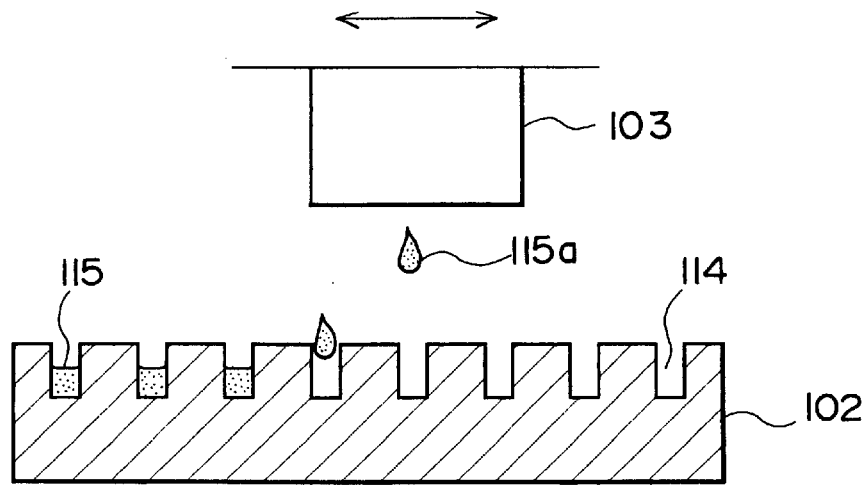
FIG. 9 illustrates in detail the process of filling an opaque material.

The method of applying the opaque material involves ejecting from an inkjet head 103 an opaque ink 115a consisting of an opaque material that is dissolved or dispersed in an organic solvent, as shown in FIG. 9. During this time, the position at which the opaque ink 115a hits is controlled by controlling the movement of the head 103 in the direction shown by the arrows in the figure, for example, in such a manner that a uniform quantity of the ink 115a fills each of the concavities 114 formed in the template 102. Once all of the concavities 114 have been filled uniformly with the ink 115a, the filling ends. If an ink 115a comprising a solvent component is used, that solvent component is removed by thermal processing. Note that, since the opaque layer 115 contracts due to the removal of the solvent component, it is necessary to apply a sufficient quantity of the ink 115a to ensure that the thickness that remains after the contraction can ensure the required opacity.

Figure 8B:
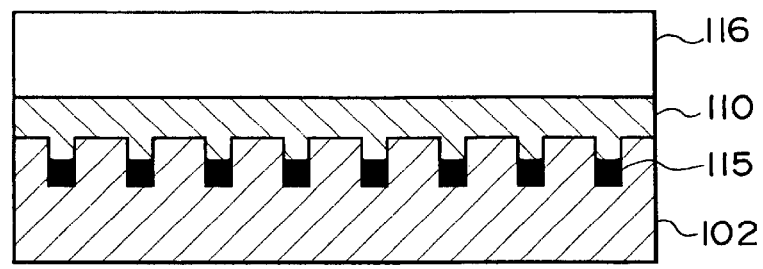

Ink Filling Layer Formation Step (FIG. 8B)

In an ink filling layer formation step, an ink filling layer precursor is coated onto the template 102 on which is formed the opaque layer 115, to form the ink filling layer 110. First of all, the ink filling layer precursor is coated onto the surface of the template 102 that is provided with the concavities 114.

Next, after a reinforcing plate 116 has been attached to the ink filling layer precursor coated on the template 102, hardening processing is performed to correspond to the ink filling layer precursor that is used, to form the ink filling layer 110. If, for example, a resin that is hardened by ultraviolet rays is used for the ink filling layer precursor, ultraviolet rays are shone from the reinforcing plate 116 side for a predetermined time to cause the resin to harden and thus form the ink filling layer 110.

Any well-known method can be used for coating the ink filling layer precursor, such as a spin-coating method, dipping method, spray-coating method, roll-coating method, or bar-coating method.

In this case, it is preferable that the ink filling layer precursor that is coated onto the template 102 is a material that is hardened by the application of at least one of light and heat. This makes it possible to use a general-purpose exposure apparatus, baking oven, or hotplate, enabling reductions in equipment costs and installation space.

A resin that is hardened by ultraviolet rays is particularly preferable as the material of the ink filling layer 110. More specifically, it is preferable to use an acrylic resin that is hardened by ultraviolet rays, as it is commercially available on the market and a photosensitive material is easy to obtain.

Since the reinforcing plate 116 is used with the objective of reinforcing the color filter, it is selected in accordance with the color filter that is to be fabricated. A substance that has a suitable mechanical strength and also has a high level of optical transmissivity to enable sufficient light from the display panel to pass therethrough may be used as the reinforcing plate 116. For example, a glass substrate or a substrate or film of a plastic such as a polycarbonate, polyacrylate, polyether sulfone, amorphous polyolefin, polyethylene terephthalate, or polymethyl methacrylate could be used as the reinforcing plate 116.

Figure 8C:
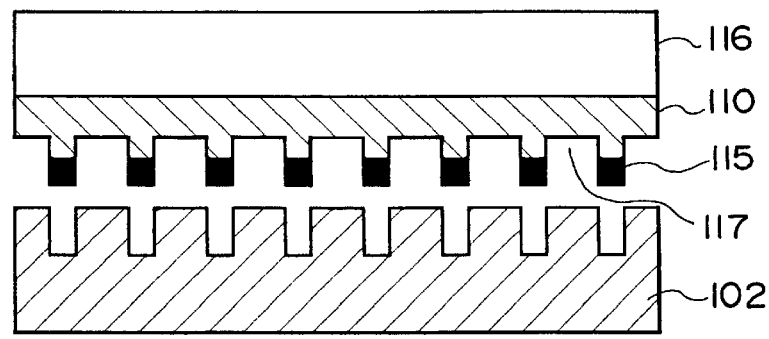

Note that, if the reinforcing plate 116 is not necessary for strengthening the color filter, it may be separated therefrom.
Separation Step (FIG. 8C)

In a separation step, the hardened ink filling layer 110 is separated from the template 102. Once the ink filling layer 110 is sufficiently hardened, the ink filling layer 110 is firmly attached to the reinforcing plate 116 and the ink filling layer 110 is also firmly attached to the opaque layer 115. Therefore, if the reinforcing plate 116 is peeled off from the template 102, the reinforcing plate 116, the ink filling layer 110, and the opaque layer 115 will be removed as an integral assembly.

Figure 8D:
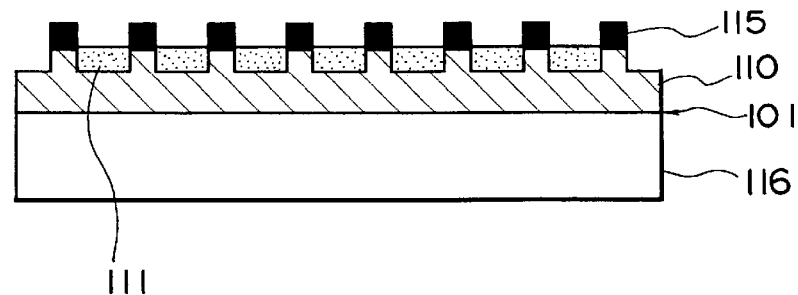

Color Pattern Layer Formation Step (FIG. 8D)

In a color pattern layer formation step, the ink filling concavities 117 of the ink filling layer 110 that has been separated from the template 102 are filled with colored inks 111a, to form a color pattern layer 111.

The method used for applying the colored inks 111a is not particularly limited, but an inkjet method that ejects inks from a head could be used therefor. The colored inks ejected from the head may be those that are transparent when dry. When ejected from a head, it is particularly preferable that these inks have a low viscosity and a high density, and they are fabricated of colored pigments or dyestuffs that are mixed into an organic solvent or water.

Figure 10:
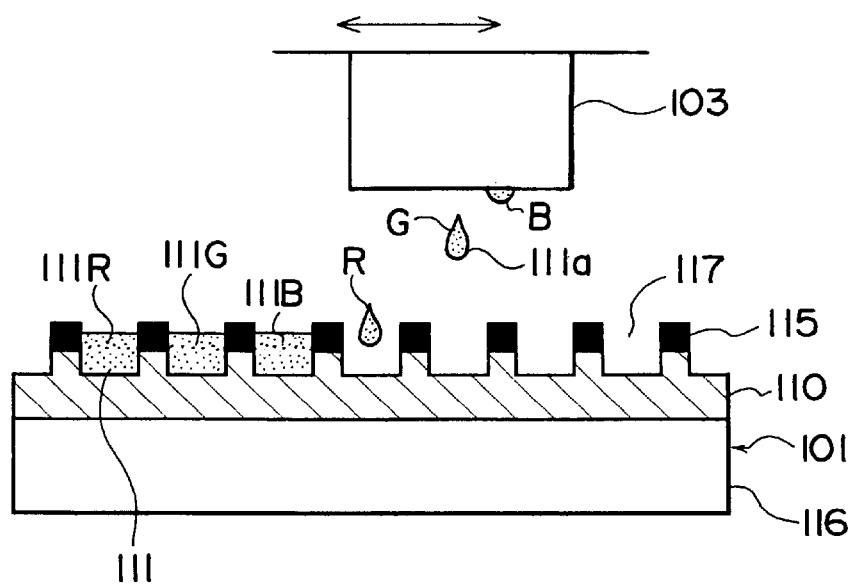
FIG. 10 illustrates in detail the process of filling colored inks.

With an inkjet method, the inkjet head 103 ejects the colored inks 111a corresponding to the primary colors, as shown in FIG. 10, so that the colored inks 111a fill the ink filling concavities 117 for forming the Pixels allocated to each of the colors. In this figure, a red colored ink R, a green colored ink G, and a blue colored ink B each hit neighboring columns, by way of example. In an example of the sequence of this filling, the inks fill one column of color pixels while the head reciprocates from in front of this figure towards the rear thereof, then the head moves in the direction of the arrows in the figure and inks fill the neighboring column of color pixels. Repetition of this sequence makes it possible to form the color pattern layer 111 in the ink filling concavities 117.

Once the colored inks 111a have been applied, the solvent component within the colored inks 111a is evaporated by thermal processing to solidity them. This thermal processing is done by using a heater, for example, to heat the reinforcing plate 116 to a predetermined temperature (such as approximately 70° C.). The volume of the color pattern layer 111 formed by the evaporation of the solvent from the colored inks 111a is less than before the solvent was evaporated, as shown in FIG. 8D. If this decrease in volume is too dramatic, the process of ejecting and heating the colored inks 111a can be repeated until the thickness of the ink film is sufficient for a color filter. This processing ensures that the solvent evaporates from the colored inks 111a until finally only the solid portions of the colored inks 111a, to form the color pattern layer 111.

After the color pattern layer 111 has been formed, heating is performed at a predetermined temperature (for example, 120° C.) for a predetermined time (for example, approximately 20 minutes) in order to dry out the colored inks 111a completely, then a predetermined resin is used to form a protective film (not shown in the figure) to protect and flatten the filter surface. Finally, if transparent electrode are provided on the protective film, the color filter 101 of the present invention is completed.

Note that colored inks in three primary colors are used in the above embodiment to fabricate the color filter, but other primary colors could also be used, depending on factors such as whether an additive color process or a subtractive color process is employed. In addition, instead of a color filter, this process can be used to fabrication a single-color display filter or a display filter that blocks the effects of ultraviolet rays or the like, by using a colored ink of a single color or an ink in which is mixed a material that has the effect of blocking ultraviolet rays or the like.

The resist layer 121 was described above as being formed of a positive resist, but a negative resist could equally well be used. In such a case, a mask is used wherein the relationship between exposed portions and non-exposed portions is the inverse of that of the mask 123.

The exposure method could be such that no mask is used and the resist is exposed directly in a pattern by laser light or an electron beam.

Since the ink filling layer 110 that separates the pixels of the color filter 101 is formed in the present embodiment by a transfer method after the opaque ink 115a has been applied, as described above, the opaque layer 115 and the ink filling layer 110 (the separating member) can be fabricated simultaneously. This means that the efficiency of use of materials is higher than that of the conventional art, and also the number of steps can be reduced. It is therefore possible to reduce the cost of the color filter to less than that in the conventional art.

In addition, once the template 102 has been fabricated, it can be used repeatedly within the limits of its durability, so that the process of making the template 102 can be omitted for the second and subsequent filters, further reducing the number of steps and thus making it possible to reduce the cost of color filters even further.

Fourth Embodiment

A fourth embodiment of the present invention provides another method of fabricating the template for the above described third embodiment.

In the present embodiment, the fabrication process other that the steps for forming the template are the same as those of the third embodiment, so further description thereof is omitted.

Figure 11A:
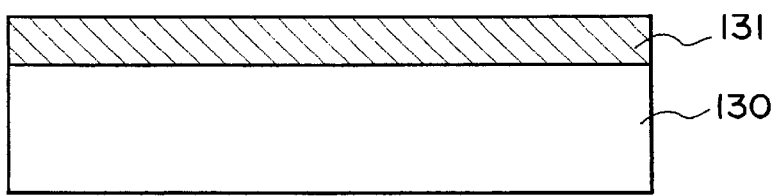
FIGS. 11A to 11C illustrate the process of fabricating a template of a fourth embodiment.

Cross-sectional views illustrating the method of fabricating the template in accordance with this fourth embodiment are shown in FIGS. 11A to 12C.
Resist Layer Formation Step (FIG. 11A)

In the resist layer formation step, a resist layer 131 is formed on a base plate 130. The material of the base plate 130 is not restricted so long as it can fulfill the role of a support during the patterning of the resist layer 131 by lithography, it has properties such as the mechanical strength and chemical resistance necessary for the processing, and has good wettability and adhesiveness with respect to the resist layer 131. For example, a material such as glass, quartz, silicon wafer, resin, metal, or ceramic could be used as the base plate 130. A glass template is used in the present embodiment, with the surface thereof being polished to a flat using a cerium oxide type of polishing agent, then washed and dried.

Since the material and formation method of the resist layer 131 can be considered to be the same as in the above described third embodiment, further description thereof is omitted.

Figure 11B:
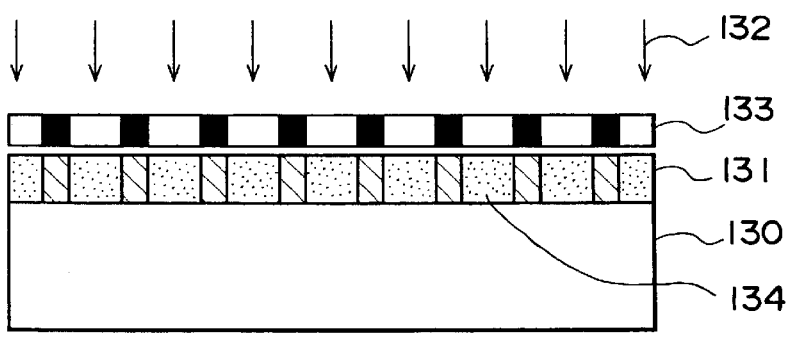

Exposure Step (FIG. 11B)

In the exposure step, the resist layer 131 is covered with a mask 133 in accordance with a predetermined pattern, then light 132 is shone thereon to expose the resist.

The mask 133 is a screening member that is formed in a pattern such that the light 132 passes therethrough only in regions corresponding to light-exposed regions 134. This pattern is formed in to allow the light 132 to pass through in regions corresponding to the ink filling concavities 117 of the pixel region. In other words, the relationship between the regions through which light passes and the regions through which light does not pass is the inverse of that of the above third embodiment. Of course, if a negative resist is used, this relationship is again inverted.

Figure 11C:
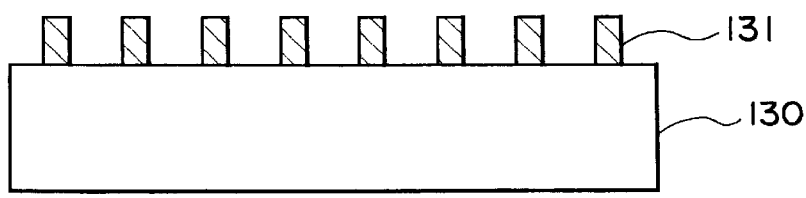

Development Step (FIG. 11C)

In the development step, the resist material is removed from the light-exposed regions 134 by development performed under fixed conditions, after the resist layer 131 has been exposed by the light 132. This processing selectively removes the resist material from the light-exposed regions 134 that had been exposed to the light 132, to reveal the base plate 130.

Figure 12A:
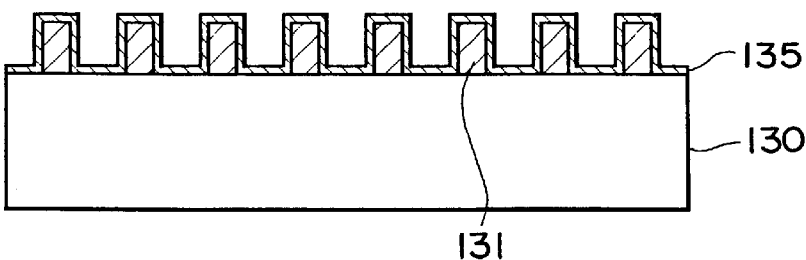
FIGS. 12A to 12C illustrate the rest of the process of fabricating the template of the fourth embodiment.

Conductivity Step (FIG. 12A)

In a conductivity step, a conductive layer 135 is formed an the base plate 130 to make the surface thereof conductive.

Figure 12B:
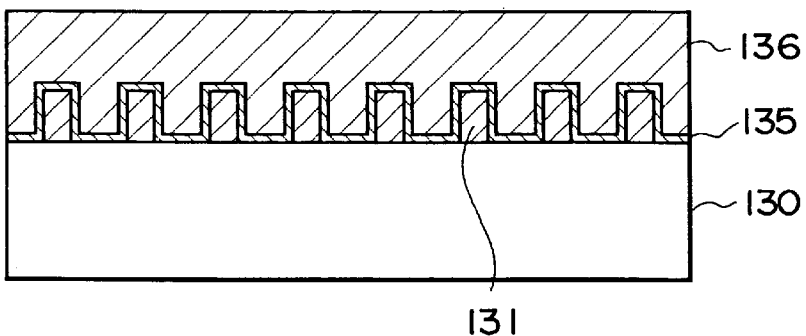

A material that is provided with electrical conductivity for promoting the growth of a plated (metal) layer 136 as shown in FIG. 12B is sufficient as the material of the conductive layer 135, such as Ni formed to a thickness of 500 to 1000 Angstrom ($10^{-10}$ m). Any of various methods could be used for forming the conductive layer 135, such as sputtering, CVD, vapor deposition, or nonelectrolytic plating. Note that if it is possible to grow the plated layer 136 without using the conductive layer 135, this step is unnecessary.

Plated (Metal) Layer Formation Step (FIG. 12B)

In a plated layer formation step, the plated layer 136 is grown. First of all, the resist layer 131 and the base plate 130, which have been made conductive by the conductive layer 135 are used as the anode and a tip-shaped or ball-shaped Ni is used as the anode, connected to the electrodes of a plating device that is not shown in the figures, Ni is electrodeposited by this electroplating method to form the plated layer 136.

A plating liquid of the following composition may be used as the electrolyte:

| | |
|---|---|
| Nickel sulfamate: | 500 g/l |
| Boric acid: | 30 g/l |
| Nickel chloride: | 5 g/l |
| Leveling agent: | 10 mg/l |

Figure 12C:
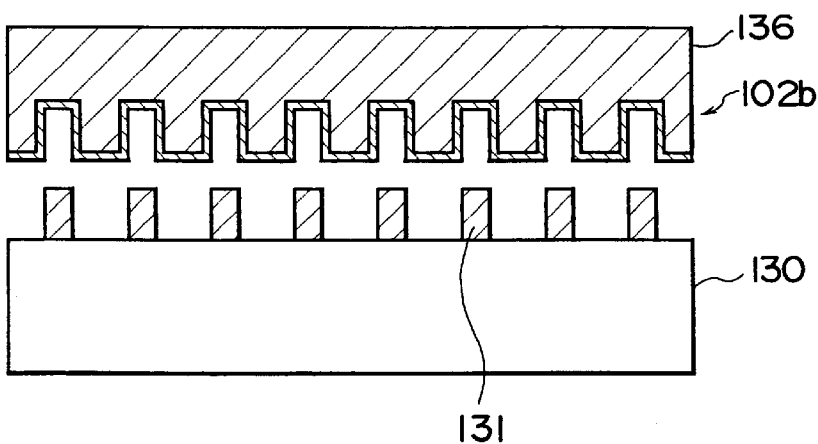

Separation Step (FIG. 12C)

In the separation step, the conductive layer 135 and the plated layer 136 are separated from the base plate 130 and the resist layer 131. After the separation, a template 102b can be completed by washing it if necessary. Note that the conductive layer 135 could be removed from the plated layer 136 by separation processing, if necessary.

If the template 102b that has been fabricated as described above is used as the template of the third embodiment, the color filter of the present invention can be fabricated therefrom.

Details of the method of fabricating this color filter are similar to those of the third embodiment.

Note that the resist layer 131 was described above as being formed of a positive resist, but a negative resist could equally well be used. In such a case, a mask is used wherein the relationship between exposed portions and non-exposed portions is the inverse of that of the mask 133.

In addition, the exposure method could be such that no mask is used and the resist is exposed directly in a pattern by laser light or an electron beam.

With the present embodiment as described above, a template suitable for forming a color filter can be fabricated by electroplating. The form of this template is similar to that of the third embodiment, so it can achieve effects similar to those of the third embodiment as described above. In addition, since the template fabricated by the present embodiment is of metal and thus is rigid, it is durable and also has the effect of reducing fabrication costs even further.

Fifth Embodiment

Figure 13A:
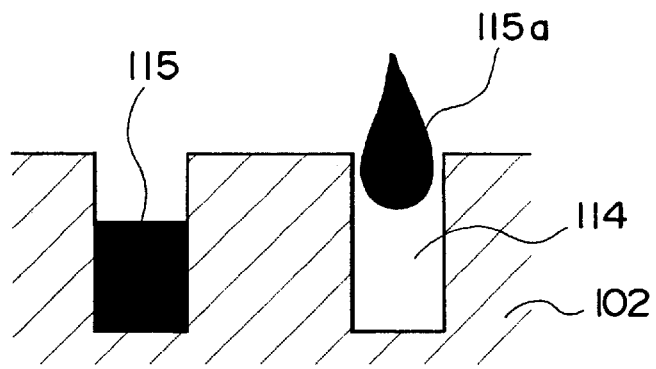
FIGS. 13A and 13B illustrate a state in which opaque ink fills an ordinary template.
Figure 13B:
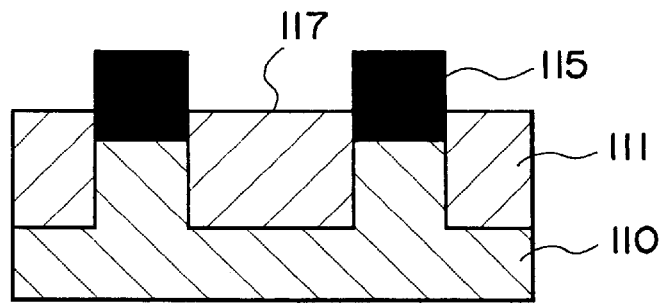

In the above described third embodiment, the concavities 114 formed in the template 102 have inner side surfaces that are shaped to descend at right angles, parallel to each other. In addition, if the concavities 114 are filled with an opaque material and resin to form the opaque layer 115 and the ink filling layer 110, the shape of the resultant concavities 117 is also such that the inner side surfaces thereof descend at right angles, as shown in FIG. 13B.

With concavities 114 and 117 of this shape, increasing the pixel density of the liquid crystal panel will restrict the surface area of aperture portions, which is thought to make it difficult for the ink 115a forming the opaque layer 115 or the colored inks 111a (see FIG. 10) forming the color pattern layer 111 to hit them.

Figure 14A:
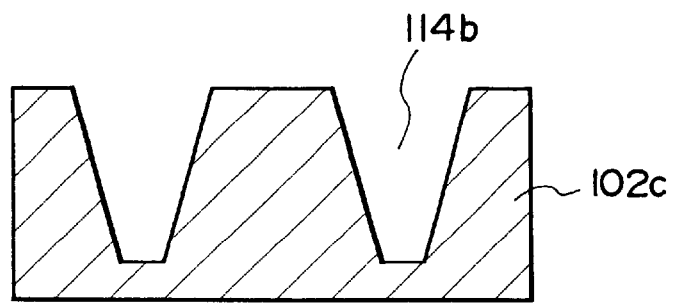
FIGS. 14A and 14B illustrate a state in which opaque ink fills a template of a fifth embodiment.
Figure 14B:
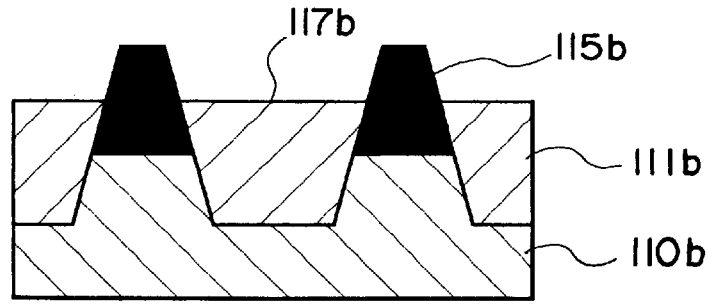

Thus the inner side surface of concavities provided in the template of the present embodiment are formed inclined, in a tapered shape. For example, concavities 114b formed in a template 102c shown in FIG. 14A are tapered so that the inner side surfaces thereof are inclined. If these concavities 114b have inner side surfaces that are inclined in this manner, the surface area of each aperture portion thereof is broader than the base surface, so that the concavities 114b can be filled reliably with the opaque ink 115a even when the pixel density is increased. This also facilitates the separation of an opaque layer 115b and an ink filling layer 110b from the template 102c.

If such a template 102c is used to form the opaque layer 115b and the ink filling layer 110b, the shape of resultant concavities 117b will also be tapered.

Figure 15A:
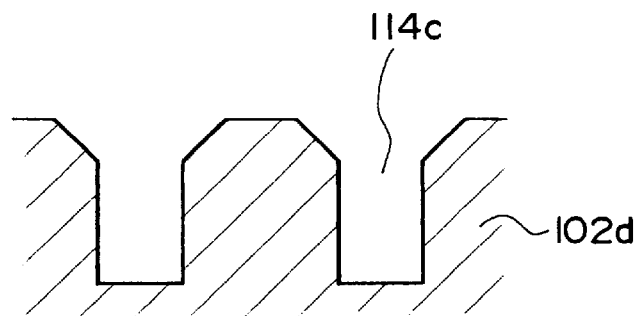
FIGS. 15A and 15B illustrate a state in which opaque ink fills a modification of the template of the fifth embodiment.

The configuration could also be such that tapering is provided only at the aperture edge portions of the inner side surfaces of the concavities 114b in the template 102c. For example, a tapered shape could be formed only at aperture edge portions of concavities 114c in a template 102d, as shown in FIG. 15A. If the concavities 114c are formed in this manner so that the aperture edge portions are tapered, the surface area of each aperture portion of the concavities 114c is broader than the base surface thereof, so that the concavities 114c can be filled reliably with the opaque ink 115a even when the pixel density is increased.

Figure 15B:
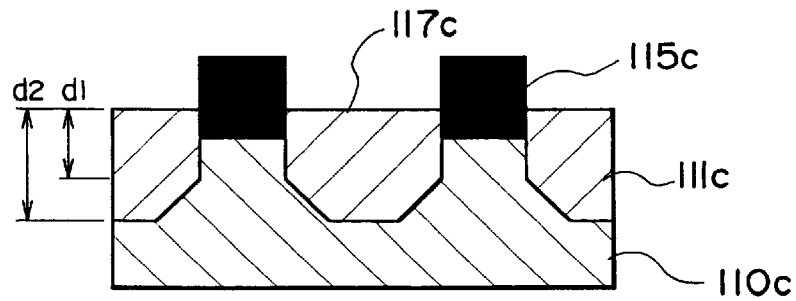

In particular, if the concavities 114c provided with tapering only at aperture edge portions are used, this has the effect of making it difficult for color unevenness to occur at peripheral regions of a color pattern layer 111c within the side walls of an ink filling layer 110c transferred from these concavities 114c. In other words, the ink filling layer 110c that is transferred from the concavities 114c provided with a tapered shape only in aperture edge portions thereof will have tapering only at the bases of the side walls thereof, as shown in FIG. 15B. If this color pattern layer 111c is viewed from the observation direction (from above, in these figures), there is only a small difference between the thickness d2 of the color pattern layer 111c at portions that are tapered and the thickness d1 thereof at portions some distance from the bases of the side walls. Since any difference in thickness in the color pattern layer 111c is observed as a difference in color tone or brightness, minimizing this difference in thickness controls any color irregularities due to differences in color tone or brightness to be as small as possible. If the slope of the tapering at the aperture edge portions of the concavities 114c is made gentle enough that the opaque ink 115a (see FIG. 13A) is guided into the concavities 114c, this difference in thickness can be reduced even further so that there is substantially no color unevenness.

If the present embodiment is configured as described above, the side surfaces of the concavities of the template are inclined to form a tapered shape so that the opaque ink can be guided reliably and easily into the concavities. This facilitates control over the head, which has the effect of improving the yield during manufacture. In particular, if only the aperture edge portions of the concavities are provided with a tapered shape, this makes it possible to suppress any color unevenness in the color filter to a minimum.

Sixth Embodiment

The present embodiment involves a method of making a color filter wherein a surface of a protective film is flattened to correspond to an optically transmissive region of a colored layer by forming a protective film with the aid of a template provided with a surface that is flat in at least a predetermined region, when that protective film is formed on a colored layer after that colored layer has been formed by a pigment dispersion method. Note that the present embodiment is not limited to a case in which the colored layer is formed by a pigment dispersion method; it can also be applied to color pattern layers formed in accordance with any of the previous embodiments. In other words, the present embodiment can be used regardless of the method used for forming the colored layer (color pattern layer).

Color Filter Fabrication Process

The present embodiment is described below with reference to FIGS. 16A to 19C. In this case, FIGS. 16A to 19C are cross-sectional views of the process of fabricating the color filter.

Figure 16A:
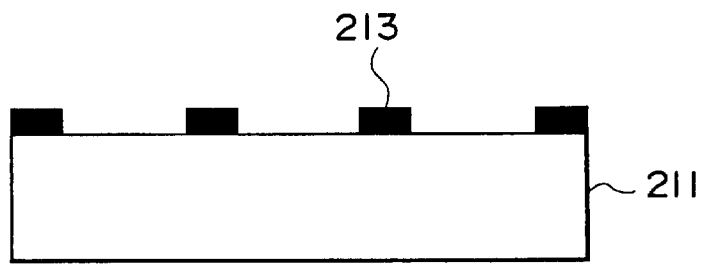
FIGS. 16A to 16C illustrate the process of fabricating a color filter of a sixth embodiment.

Black Matrix Formation Step (FIG. 16A)

A layer that is opaque, such as a layer of chrome, is formed to a predetermined thickness (such as 0.15 μm) by a method such as sputtering on a transparent reinforcing plate 211 that acts as a foundation for the color filter, then a resist layer (not shown in the figure) is further formed thereon. Next, this resist layer is exposed in accordance with a predetermined pattern, then the resist layer is developed to pattern. The thus patterned resist layer is used as a mask for etching the chrome layer, then the resist layer is removed to form an opaque patterned layer, in other words, an opaque layer (black matrix) 213.

Note that opaque layer 213 can be configured as a deposition of chrome and chrome oxide so that it reduces reflection by means of light interference effect.

A polyimide resin or an acrylic resin in which is dispersed a black dyestuff, black pigment, carbon black, or the like could be used as the material of the opaque layer 213.

Figure 16B:
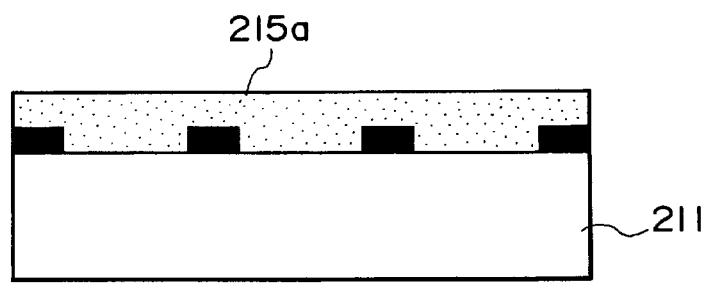

Colored Photosensitive Resin Layer R Coating Step (FIG. 16B)

A photosensitive resin that is colored red R, by dispersing a pigment used as a coloring material in a resin such as a polyimide, is coated on the reinforcing plate 211 on which is formed the opaque layer 213, to form a colored photosensitive resin layer 215a. A spin-coating method, roll-coating method, or dipping method could be used as this coating method. The thickness of the colored photosensitive resin layer 215a is determined by the color characteristics that are required, and is on the order of 1 to 2 μm.

Figure 16C:
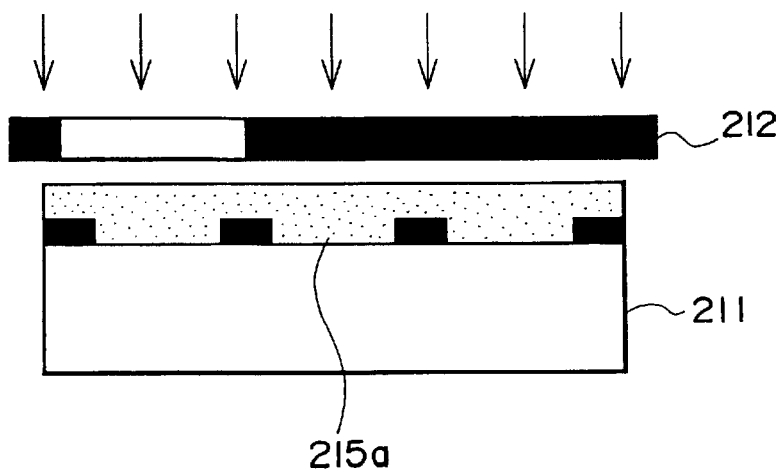

Exposure Step (FIG. 16C)

Predetermined regions of the colored photosensitive resin layer 215a are exposed through a mask 212, as shown in FIG. 16C. The mask 212 is patterned in such a manner that light passes therethrough only in regions corresponding to a red color pattern of the color filter being fabricated.

Figure 17A:
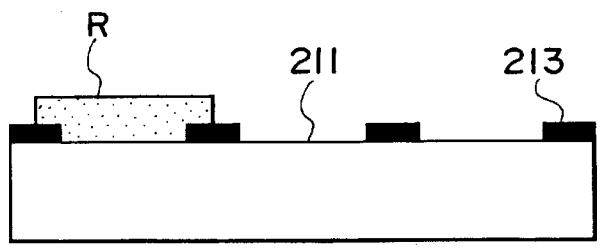
FIGS. 17A to 17C further illustrate the process of fabricating the color filter of the sixth embodiment.

Development Step (FIG. 17A)

Regions other than the light-exposed regions of the exposure step are removed by a developer, to form a colored layer R. An alkaline aqueous solution of tetramethyl ammonium hydroxide, sodium hydroxide, potassium hydroxide, calcium hydroxide, or trisodium phosphate mixed with sodium silicate could be used as the developer.

Figure 17B:
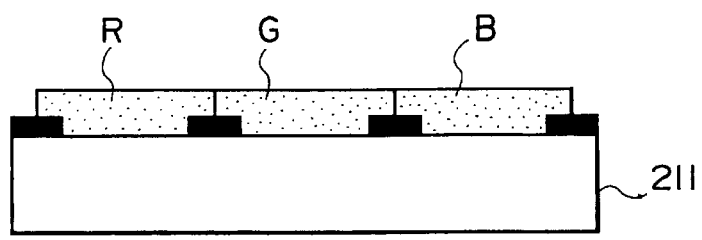

Colored Layers G and B Formation Steps (FIG. 17B)

Colored layers G and B are formed in a similar manner to the formation of the colored layer R, by repeating each of the colored photosensitive resin layer coating step, exposure step, and the development step, as shown in FIG. 17B.

Protective Film Precursor Layer Formation Step (FIGS. 17C to 18B)

Figure 17C:
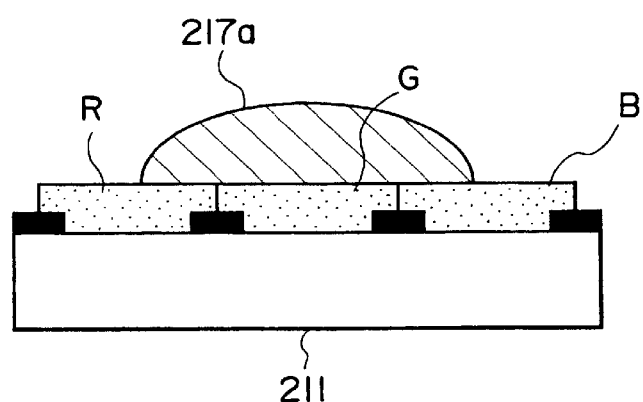

A protective film precursor 217a is dropped on top of the colored layers R, G, and B, as shown in FIG. 17C. The composition of the protective film, precursor 217a is not particularly limited, provided it can function as a protective film without affecting the optical transmissivity and color characteristics required of the color filter, once it is turned into the protective film, and thus various different resin, glass, or ceramic materials can be used therefor.

In addition, the protective film precursor 217a is preferably of a material which can be hardened by the application of energy. With such a property, the protective film precursor 217a will form a solid film when turned into the protective film, increasing the reliability of this protective film.

The energy applied thereto is preferably one or both of light and heat. This makes it possible to use a general-purpose exposure apparatus, baking oven, or hotplate, enabling a reduction in equipment cost and improving the mass-productivity. The protective film precursor 217a could be selected from the materials that can be used for the ink filling layer precursor 11 of the first embodiment.

Figure 18A:
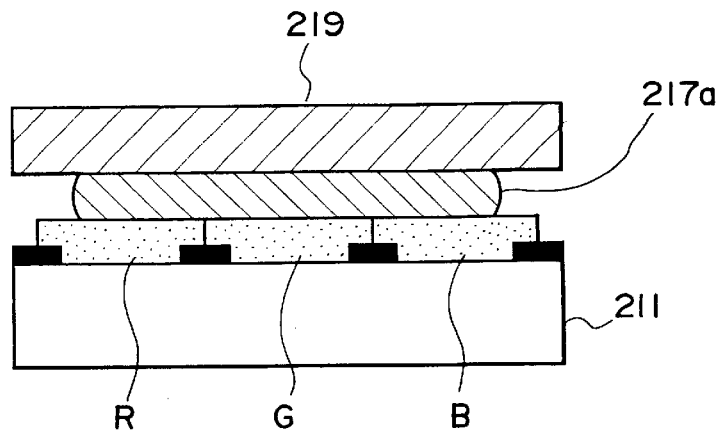
FIGS. 18A to 18C further illustrate the process of fabricating the color filter of the sixth embodiment.
Figure 18B:
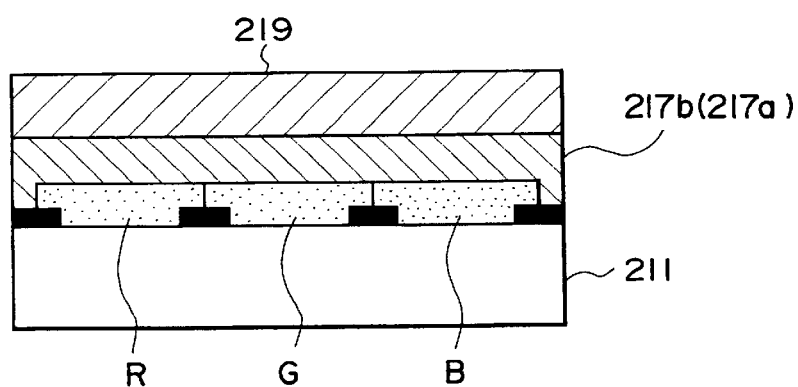

A protective film precursor layer 217b is formed within a predetermined region by attaching a template 219, which has a flat surface corresponding at least to the colored layers R, G, and B (filter elements), to the protective film precursor 217a that has been dropped on the colored layer, and pressing down so as to spread the precursor, as shown in FIG. 18B. In this case, it is desirable that the flatness of the surface of the template 219 is highly precise. More specifically, the roughness of the template 219 should be within ±0.1 μm.

In this step, the protective film precursor could be attached to the template 219 by using a method such as spin-coating or roll-coating to apply it beforehand to either the colored layers R, G, and B or the template 219.

Figure 18C:
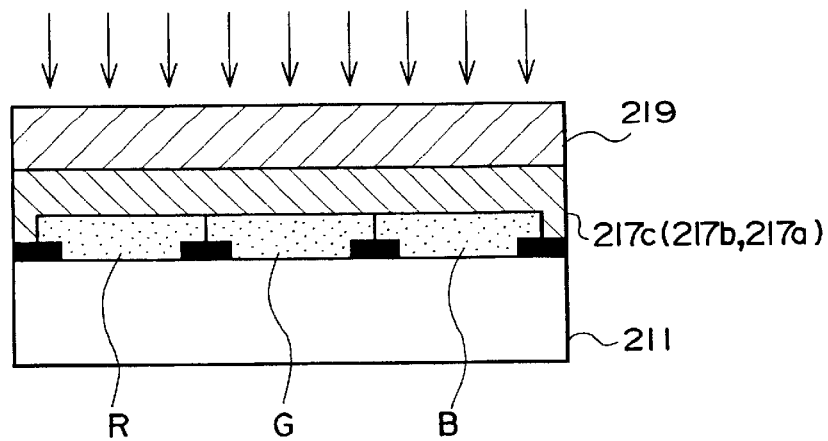

Protective Film Precursor Layer Hardening Step (FIG. 18C)

After the protective film precursor layer 217b has been formed over the predetermined region, the protective film precursor layer 217b is hardened by processing appropriate to the material thereof, to obtain a protective film 217c. Since an acrylic resin hardened by ultraviolet rays is used in the present embodiment, the protective film precursor layer 217b is hardened by illuminating it with ultraviolet rays under predetermined conditions.

Figure 19A:
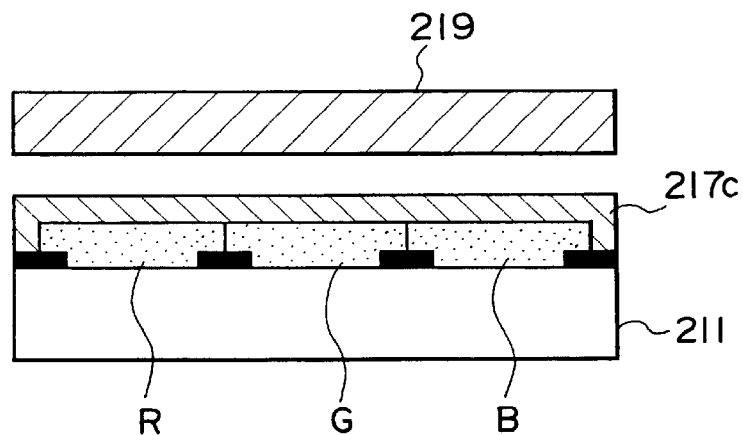
FIGS. 19A to 19C illustrate the rest of the process of fabricating the color filter of the sixth embodiment.

Template Separation Step (FIG. 19A)

After the protective film 217c has been formed, the template 219 is separated from the reinforcing plate 211, as shown in FIG. 19A.

Figure 19B:
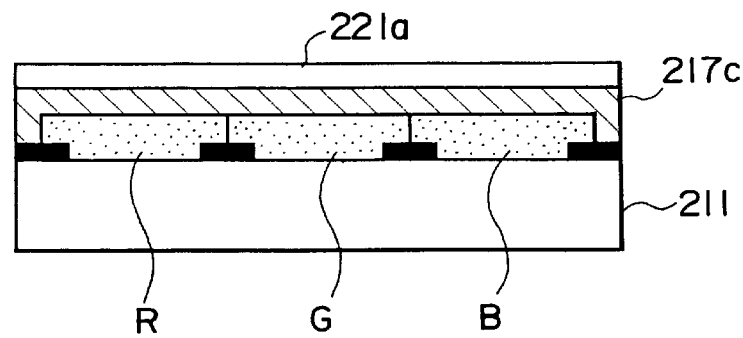

Transparent Electrode Formation Step (FIG. 19B)

Next, a transparent electrode 221a is formed over the entire surface of the protective film 217c by a well-known method such as sputtering or vapor deposition. A material provided with both optical transmissivity and electrical conductivity can be used as the material of the transparent electrode 221a, such as indium tin oxide (ITO) or a composite oxide such as indium oxide and zinc oxide.

Figure 19C:
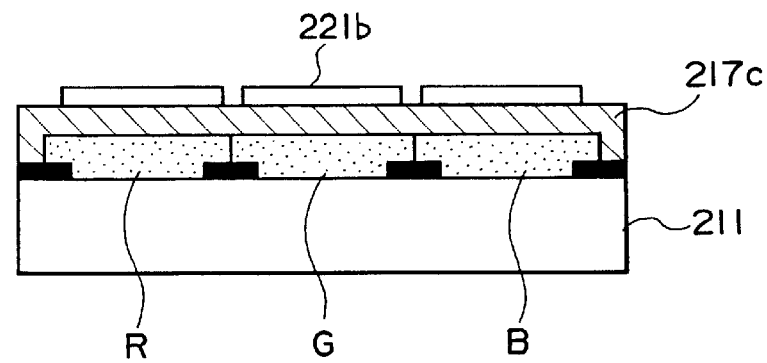

Patterning Step (FIG. 19C)

If metal-insulator-metal (MIM) technology, using alternate layers of metal and an insulator, is employed as the method of driving the liquid crystal panel, the transparent electrode 221a is then patterned.

Alternatively, if a method such as thin film transistors (TFTs) is used for driving the liquid crystal panel, this step is not necessary.

The configuration of the present embodiment makes it possible to flatten the surface of the protective film in a highly precise manner, so that the voltage applied to common electrodes formed on that protective film can be made uniform. If a simple matrix drive method is used for the liquid crystal panel, therefore, the occurrence of crosstalk can be suppressed.

In addition, the present embodiment makes it possible to suppress variations in the surface resistance of common electrodes (ITO film) formed on the protective film, thus making it possible to prevent display variations in the liquid crystal panel.

Seventh Embodiment

In the present embodiment, a protective film and spacers for a color filter are formed integrally by a template provided with concavities at predetermined positions on a surface, and the spacers are disposed at suitable positions.

Color Filter Formation Step

The present embodiment is described below with reference to FIGS. 20A to 21C. In this case, FIGS. 20A to 21C are cross-sectional views of steps in the formation of the color filter. It should be noted, however, that since the steps up until the formation of the opaque layer (black matrix) and the colored layer on the substrate are the same as those of the sixth embodiment, further description thereof is omitted.

Figure 20A:
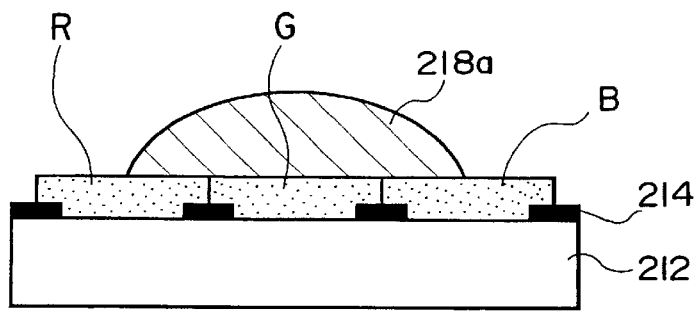
FIGS. 20A to 20C illustrate the process of fabricating a color filter of a seventh embodiment.
Figure 20B:
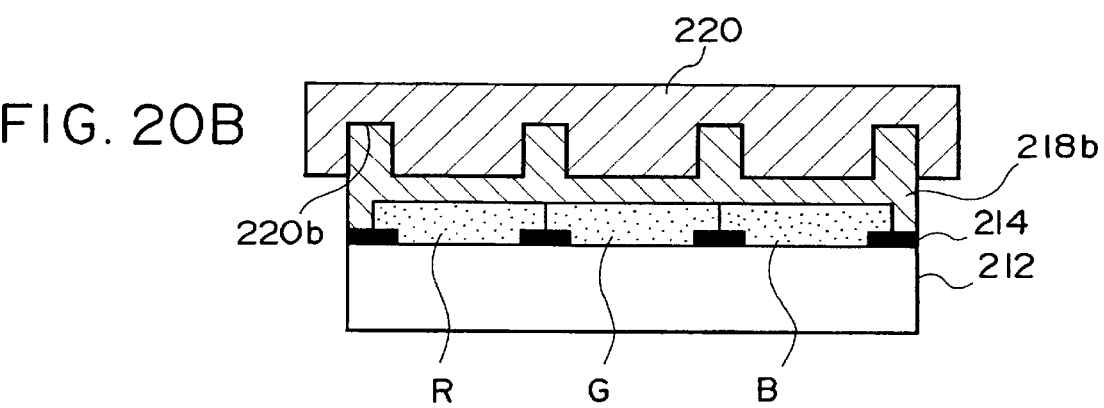

Protective Film Precursor Layer Formation Step (FIG. 20A and FIG. 20B)

A protective film precursor 218a is dropped onto the colored layers R, G, and B, as shown in FIG. 20A. The composition of the protective film precursor 218a must fulfill the function of a protective film without affecting the optical transmissivity and color characteristics required of the color filter, when it has been hardened in the subsequent step (to form the protective film). Damage to other components such as a TFT array can be prevented by also providing this protective film with the suitable strength and elasticity required of spacers 218d (see FIG. 21A). It is preferable that the coefficient of thermal expansion thereof is determined from consideration of volumetric changes due to any difference in the coefficients of thermal expansion, to ensure that the reliability of the liquid crystal panel is not affected by damage to the orientation film or the colored layer. The composition of the protective film precursor 218a having such characteristics is the same as that of the sixth embodiment.

Next, as shown in FIG. 20B, a template 220 provided with concavities 220b predetermined positions in a flat surface thereof (details of the fabrication of this template will be given later) is attached to the protective film precursor 218a that has been dropped on the colored layers R, G, and B, then is pressed to form a protective film precursor layer 218b. The depth of the concavities 220b formed in the template 220 corresponds to the height of the spacers 218d (see FIG. 21A) and is processed in accordance with the liquid crystal panel being fabricated. For a VGA type of liquid crystal panel using TFTs as drive elements, for example, this depth is on the order of 2 to 6 $\mu$m. The concavities 220b are preferably located at positions that cross the lattice-like opaque layer (black matrix) 214, as shown in FIGS. 22A to 22C. Such a configuration makes it possible for the spacers 218d to be provided protruding easily at positions crossing the lattice-like opaque layer 214. Therefore, the spacers 218d are not disposed on the colored layers R, G, and B (filter elements), making it possible to improve the yield of manufactured color filters. In addition, the effects on orientation variations of the liquid crystal and the polarization characteristics of the liquid crystal panel caused by the spacers 218d can be reduced by providing the spacers 218d protruding above the opaque layer 214, so that the image quality of the liquid crystal panel can be maintained in a desirable state.

Any shape such as circular cylindrical or square cylindrical can be used as the shape of the concavities 220b, but a circular cylindrical shape is particularly preferable. Disturbances in the orientation of the liquid crystal can be suppressed by forming the spacers 218d of a circular cylindrical shape.

Furthermore, it is not necessary to dispose the spacers 218d at all of the lattice points of the opaque layer (black matrix) 214; they may be disposed at only a few desired lattice points. It should be noted, however, that it is necessary to dispose the spacers 218d in such a manner that a necessary strength is achieved, in order to maintain a uniform cell gap. The disposition of the spacers 218d is preferably within a range of 100 to 200 $\mu$m, for example.

The pattern in which the colored layers R, G, and B (filter elements) are disposed is not limited to a mosaic array as shown in FIG. 22A, but it could also be a triangular array as shown in FIG. 22B or a strip array as shown in FIG. 22C. In such a case, the spacers 218d can be disposed protruding from any desired position on the opaque layer (black matrix) 214. Note that the disposition patterns of the spacers 218d are shown in these figures by way of example and the present invention is not limited thereto.

Figure 20C:
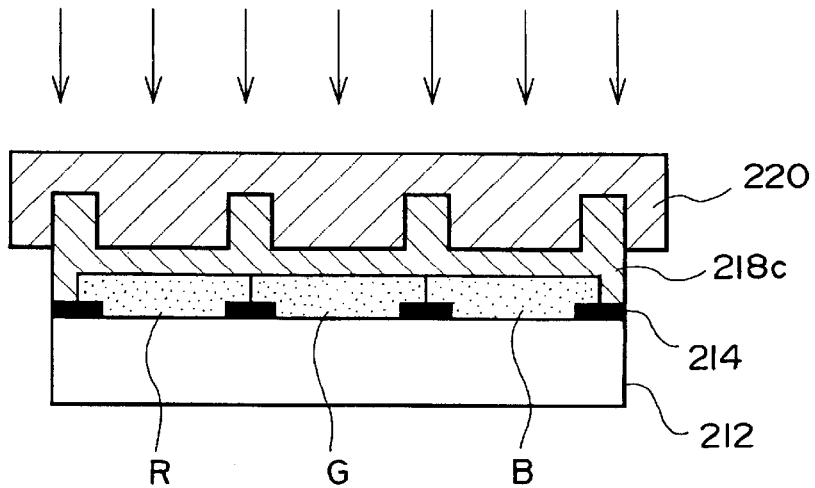

Protective Film Precursor Layer Hardening Step (FIG. 20C)

After the protective film precursor layer 218b has been formed over the predetermined region, the protective film precursor layer 218b is hardened in accordance with the composition thereof. This step causes the protective film precursor layer 218b to harden to form a protective film 218c. If an acrylic resin which is hardener by ultraviolet rays is used as the protective film precursor layer 218b, for example, ultraviolet rays are shone onto the protective film precursor layer 218b under predetermined conditions to harden it.

Figure 21A:
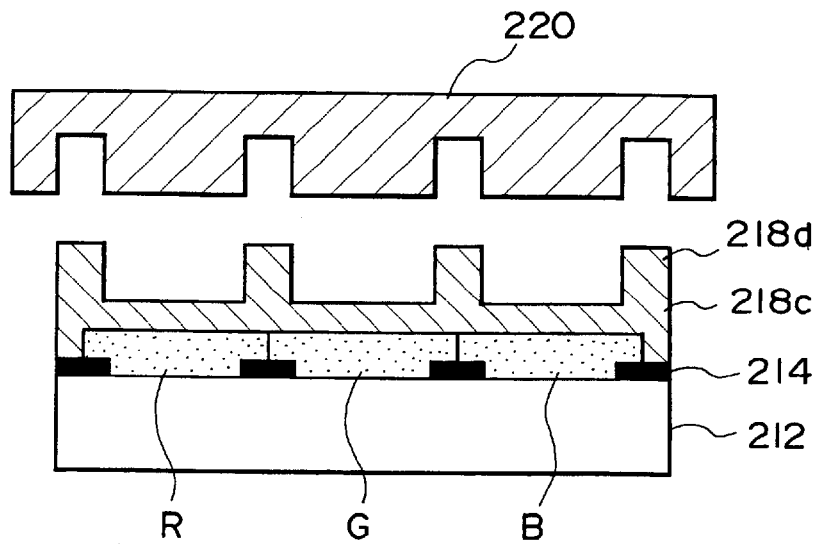
FIGS. 21A to 21C illustrate the rest of the process of fabricating the color filter of the seventh embodiment.
Figure 22A:
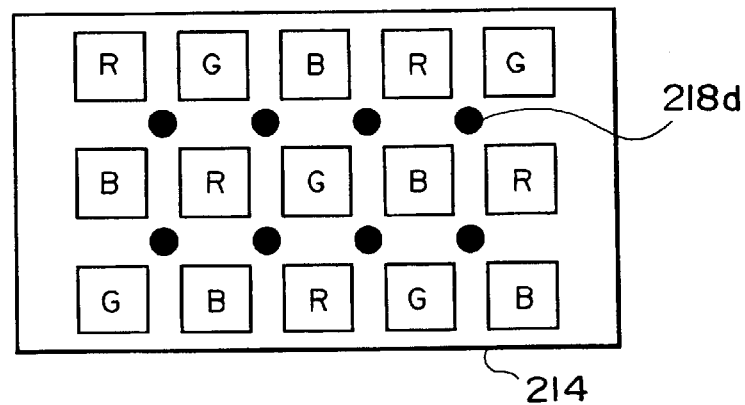
FIGS. 22A to 22C illustrate arrangement patterns of the colored layers R, G, and B (filter elements)
Figure 22B:
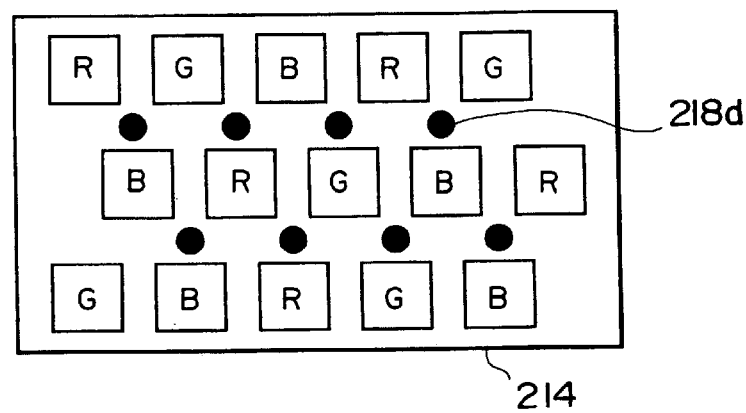
Figure 22C:
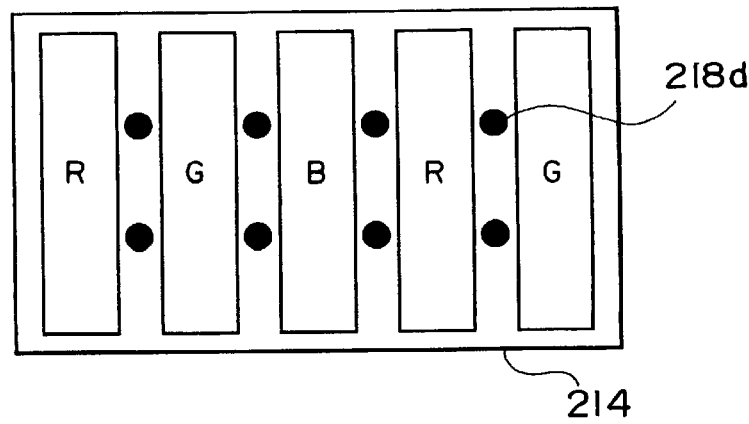

Template Separation Step (FIG. 21A)

After the protective film precursor layer 218b has hardened, the template 220 is separated from the protective film 218c. The protective film 218c on which the spacers 218d are formed integrally above the colored layers R, G, and B can thus be obtained.

Figure 21B:
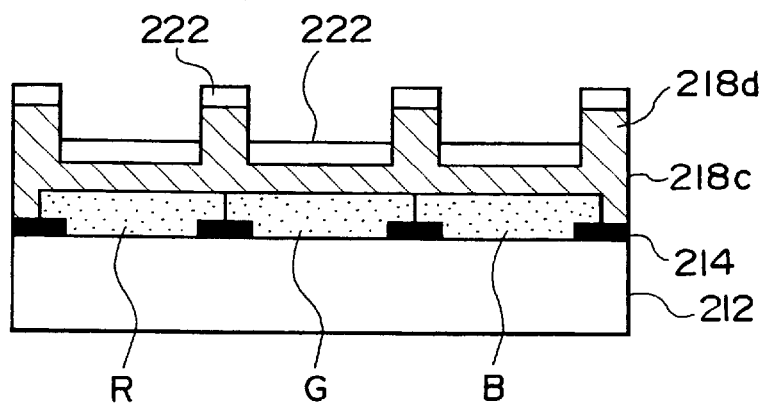

Transparent Electrode Formation Step (FIG. 21B)

Next, transparent electrodes 222 are formed on the protective film 218c. This step uses a well-known method such as sputtering or vapor deposition to form the transparent electrodes 222 over the entire surface of the protective film 218c. A material provided with both optical transmissivity and electrical conductivity can be used as the material of the transparent electrodes 222, such as indium tin oxide (ITO) or a composite oxide such as indium oxide and zinc oxide.

Figure 21C:
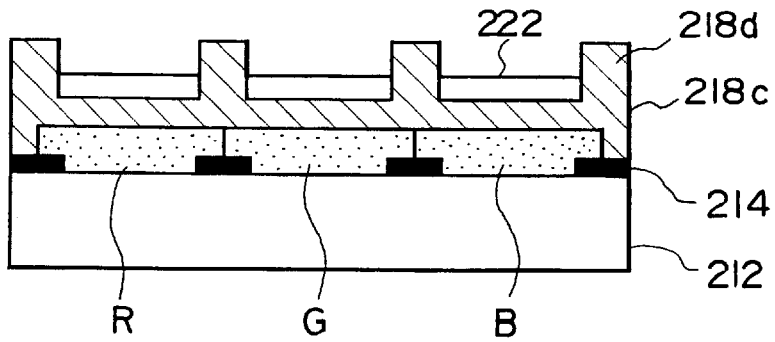

Patterning Step (FIG. 21C)

If metal-insulator-metal (MIM) technology, using alternate layers of metal and an insulator, is employed as the method of driving the liquid crystal panel, resist (not shown in the figure) is coated over the transparent electrodes 222 and the transparent electrodes 222 are patterned to a desired shape by etching.

Alternatively, if a method such as thin film transistors (TFTs) is used for driving the liquid crystal panel, this step is not necessary.

If the transparent electrodes 222 on the spacers 218d cause problems, the transparent electrodes 222 are removed from the tops of the spacers 218d by etching, using a method similar to those described above. Note that the transparent electrodes 222 need not be removed from on top of the spacers, but only if no problems are caused by leaving the transparent electrodes 222 on top of the spacers 218d.

Template Fabrication Process

The process of fabricating the template 220 used in the present embodiment will now be described, with reference to FIGS. 23A to 24B.

Figure 23A:
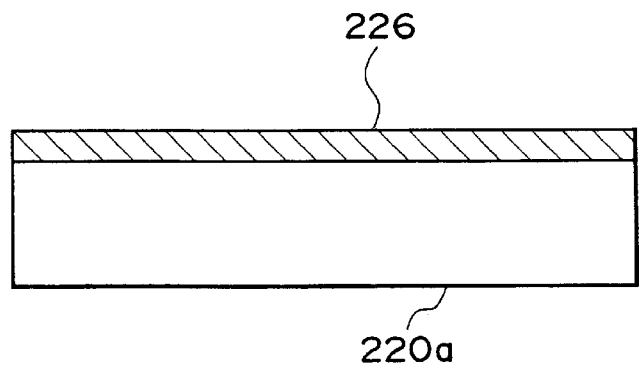
FIGS. 23A to 23C illustrate the process of fabricating a template provided with concavities in the surface thereof.

Resist Layer Formation Step (FIG. 23A)

Resist is coated over a substrate 220a made of quartz, to form a resist layer 226. As long as the substrate 220a is of a material which can be etched, it is not restricted to quartz, and glass, silicon single crystal, metal, ceramic, resin, or other material may be used therefor. The composition of the resist layer 226 could be one that is generally used in the fabrication of semiconductor devices, for example, a commercially available positive resist which is a cresol novolac type resin to which a diazo-naphthoquinone derivative is added as a photosensitive material. In this case, the positive resist is a material that can be selectively removed by a developer in exposed regions. The thickness of the resist layer 226 is sufficient to provide the necessary thickness to enable it to act as an etching mask in the subsequent etching step, which is roughly 1 to 3 $\mu$m.

Figure 23B:
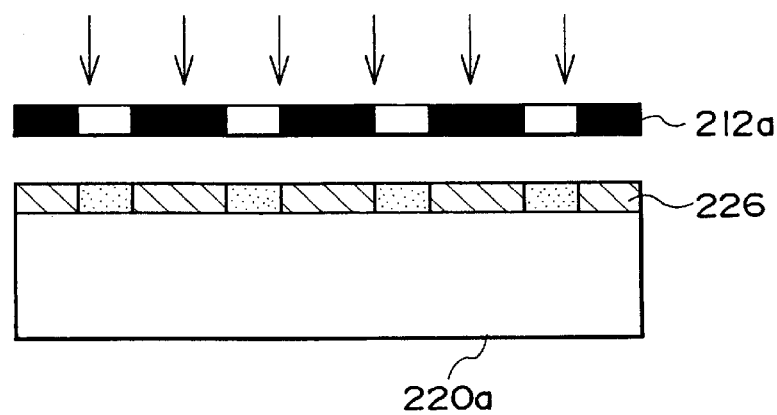

Resist Layer Exposure Step (FIG. 23B)

A mask 212a is placed on the resist layer 226, then the resist layer 226 is exposed in a desired pattern through the mask 212a. The mask 212a is formed in a pattern such that light passes therethrough only in regions corresponding to the concavities 220b shown in FIG. 20B, in other words, the previously described spacers 218d.

Figure 23C:
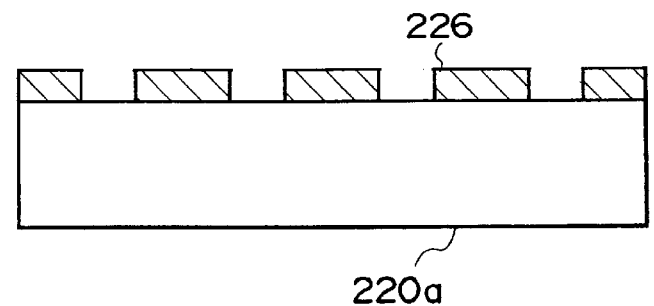

Development Step (FIG. 23C)

If development with a developer is done after the exposure, the resist is selectively removed only in regions that were exposed in the exposure step, to reveal the substrate 220a as shown in FIG. 23C, with the other regions remaining covered by the resist layer 226. An alkaline aqueous solution of tetramethyl ammonium hydroxide, sodium hydroxide, potassium hydroxide, calcium hydroxide, or trisodium phosphate mixed with sodium silicate could be used as the developer.

Figure 24A:
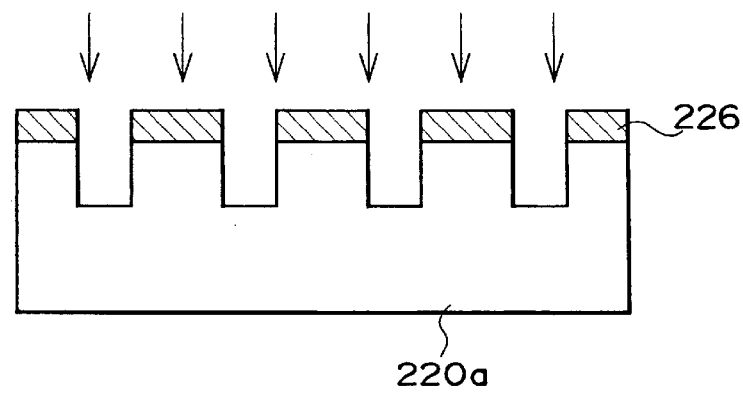
FIGS. 24A and 24B illustrate the rest of the process of fabricating a template provided with concavities in the surface thereof.

Etching Step (FIG. 24A)

The substrate 220a is etched to a predetermined depth, using the patterned resist layer 226 as a mask. Details of the etching method are as previously described for the first step, and the concavities 220b could be made square or tapered. The depth of the etching corresponds to the depth of the spacers to be formed, which is roughly 2 to 6 $\mu$m.

Figure 24B:
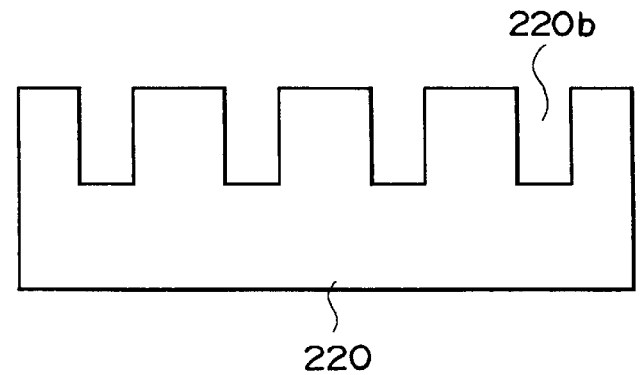

Resist Layer separation (FIG. 24B)

When the depth of the concavities 220b has reached a predetermined depth, the etching is stopped and the resist layer 226 is peeled off.

In this manner, the depth of the concavities 220b of the template 220 can be controlled very accurately by the etching technique. For example, etching errors are ±0.05 $\mu$m for a concavity depth of 3 $\mu$m. Therefore, the height of the spacers, in other words, the cell gap, can be kept constant and thus it can easily be maintained at a value that is suitable for the retardation of the liquid crystal.

If, for example, natural light is incident on an STN liquid crystal panel from above, light passing through a first polarization film is polarized linearly and light passing through a second polarization film is polarized circularly by the multiple refractions due to the liquid crystal molecules. The shift in this phase depends on the retardation and which is the product of the difference an between the refractive indices along the long and short axes of the liquid crystal molecules and the thickness (cell gap spacing) d of the liquid crystal layer. The magnitude of this retardation is an important factor in the design of the liquid crystal panel. With normally-black mode, for example, it is known that if the magnitude of the retardation falls to 0.48 $\mu$m or less with light of 550 nm, the contrast will suddenly deteriorate due to leakage of this light. With the present embodiment, not only can the positions of the spaces be adjusted easily, but also the height of the spacers (cell gap spacing) d can be made uniform, so that the magnitude of the retardation can be maintained at a suitable value. It is therefore possible to easily adjust the display characteristics of the liquid crystal, such as optical transmissivity, contrast ratio, and response speed.

In addition, since the protective film and spacers of the present embodiment can be formed as an integral assembly, there is no danger of impurities (particularly impurities such as ions) becoming mixed into the liquid crystal due to dispersion of the spacers, as in the conventional art. Therefore, when a voltage is applied to the liquid crystal sandwiched between a transparent electrode and a common electrode, to change the arrangement of the liquid crystal, the lack of impurities mixed into the liquid crystal makes it possible to ensure good drive characteristics for the liquid crystal.

Eighth Embodiment

Figure 25A:
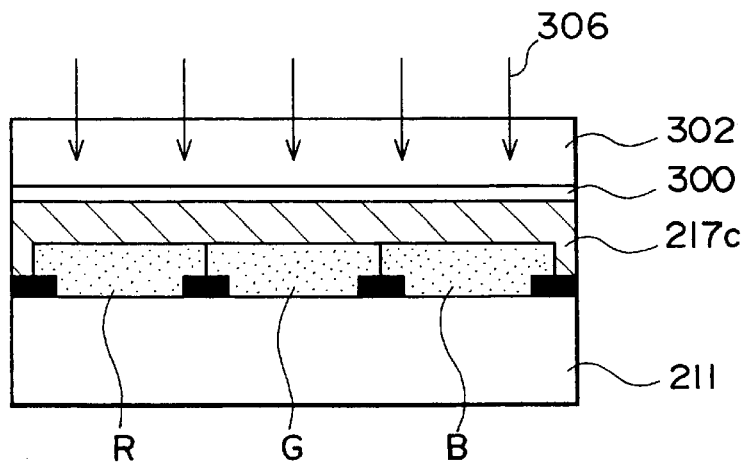
FIGS. 25A and 25B illustrate the process of fabricating a color filter of an eighth embodiment.
Figure 25B:
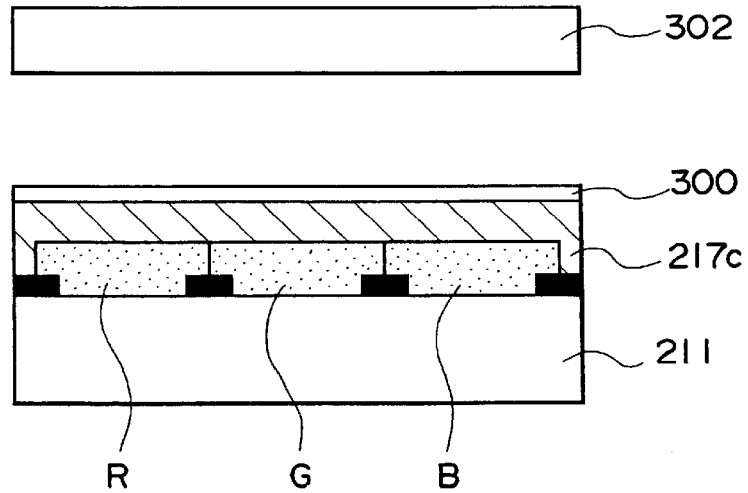

The process of fabricating a color filter in accordance with an eighth embodiment is shown in FIGS. 25A and 25B.

The present embodiment is applicable instead of the step of the sixth embodiment shown in FIG. 18A. In other words, the steps shown in FIGS. 16A to 17C are performed in the same manner as in the sixth embodiment, then the step shown in FIG. 25A is performed. The step shown in FIG. 25A differs from that shown in FIG. 18A in that a transparent electrode film 300 is formed on a template 302 beforehand. A color filter with attached transparent electrode film 300 is obtained by separating the template 302 from the transparent electrode film 300, as shown in FIG. 25B.

Note that the combination of materials configuring the template 302 and the transparent electrode film 300 may cause problems such as increasing the adhesive forces therebetween so that it is difficult for the transparent electrode film 300 to separate from the template 302. This increases the defective product ratio due to faults such as errors or cracking in the transparent electrode film 300, reducing the mass-productivity because of the time required for the separation, or reducing the durability of the template 302.

To this end, radiation 306 is shone through the template 302 onto the interface between the transparent electrode film 300 and the template 302, as shown in FIG. 25A. This reduces or even destroys the adhesive forces between the transparent electrode film 300 and the template 302, so that the transparent electrode film 300 can separate easily from the template 302, as shown in FIG. 25S.

More specifically, the various bonding forces between atoms or molecules are weakened or destroyed at the interface between the transparent electrode film 300 and the template 302, so that phenomena such as ablation occur, leading to interface separation. Alternatively, the radiation 306 vaporizes and releases components within the transparent electrode film 300, which activates a separation effect and may even help the interface separation.

To cause this interface separation due to the illumination of the radiation 306, it is necessary to make the material of the template 302 transparent to the radiation 306 and also form the transparent electrode film 300 of a material that absorbs the energy of the radiation 306.

In this case, the transmissivity of the template 302 with respect to the radiation 306 is preferably at least 10%, more particularly at least 50%. It is preferable that the transmissivity of the radiation 306 through the template 302 is made high, to reduce the attenuation of the illuminated radiation 306 as it passes through the template 306. Quartz glass may be cited as an example of the template 302. Quartz glass is highly transparent to light in the short wavelength region and has a superlative mechanical strength and thermal resistance.

Deep UV light could be cited as an example of the radiation 306. The source of this radiation could be an excimer laser, for example, which is used to output a high level of energy in the short wavelength region. If an excimer laser is used, ablation is induced only in the vicinity of the interface within an extremely short time, and the template 302 and the transparent electrode film 300 are subjected to substantially no temperature shock.

The surface of the transparent electrode film 300 that has been separated from the template 302 is then preferably washed to remove any portions that have been damaged by the radiation 306.

The above processing makes it possible to obtain the color filter shown in FIG. 25B. With the present embodiment, the transparent electrode film 300 is formed beforehand on the template 302, so that the protective film 217c and the colored layers R, G, and B are not damaged by processes such as annealing. In addition, the flexibility with which materials are selected is increased because the protective film 217c and the colored layers R, G, and B are not exposed to high temperatures during annealing.

Ninth Embodiment

Figure 26A:
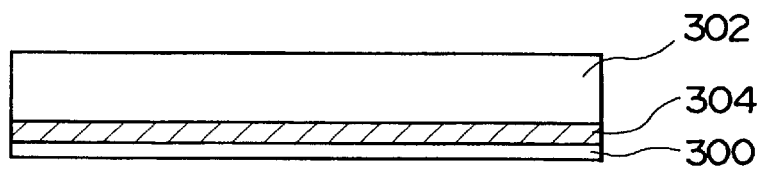
FIGS. 26A and 26B illustrate a ninth embodiment of the present invention.

A ninth embodiment of the present invention will now be described with reference to FIGS. 26A and 26B. In the present embodiment, a separation layer 304 is formed between the template 302 and the transparent electrode film 300, as shown in FIG. 26A. In other words, the separation layer 304 is first formed on the template 302, then the transparent electrode film 300 is formed on top of the separation layer 304. The rest of the structure is the same as that of the eighth embodiment.

When the radiation 306 illuminates the separation layer 304 through the template 302, as shown in FIG. 26S, the template 302 and the transparent electrode film 322 separate readily.

Various materials can be used as the material of the separation layer 304, such as various oxide ceramics such as non-crystalline silicon, silicon oxide, silicate compounds, titanium oxide, titanium oxide compounds, zirconium oxide, zircon oxide, lanthanum oxide, or lanthanum oxide compounds; (strong) dielectric materials or semiconductors; nitride ceramics such as silicon nitride, aluminum nitride, or titanium nitride; organic high-molecular materials such as acrylic resins, epoxy resins, polyamides, or polyimides; or alloys of one or more metals selected from the group of Al, Li, Ti, Mn, In, Sn, Y, La, Ce, Nd, Pr, Gd, and Sm; by way of example. Materials are selected as appropriate therefrom to suit factors such as processing conditions and the materials of the template 302 and the transparent electrode film 300.

The method of making the separation layer 304 is not particularly limited, and can be selected as appropriate to suit the composition and the film thickness thereof. More specifically, various vapor-phase methods such as CVD, deposition, sputtering, or ion plating could be used therefor, or a method such as electro-plating, nonelectrolytic plating, a Langmuir blow-jet (LB) method, spin-coating, dipping, spray-coating, roll-coating, or bar-coating.

If the separation layer 304 is too thin, damage to the transparent electrode film 300 will be greater; but if it is too thick, the amount of energy of the radiation 306 that must be applied to ensure good separability of the separation layer 304 will have to be increased. To that end, the thickness of the separation layer 304 will differ according to the separation objective and composition, but it is preferably on the order of 1 nm to 20 μm, more preferably on the order of 10 nm to 20 μm, and even more preferably on the order of 40 nm to 1 μm. Note that the thickness of the separation layer 304 is preferably as uniform as possible.

Figure 26B:
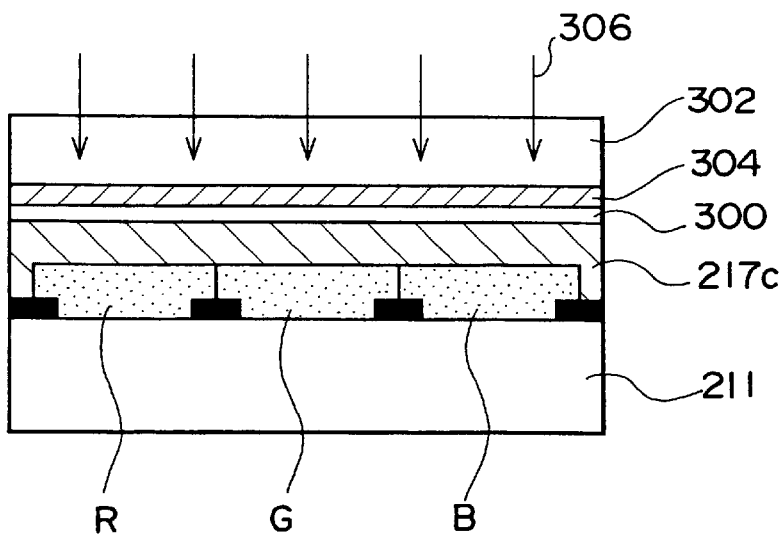

If the radiation 306 is shone onto the thus-configured separation layer 304 as shown in FIG. 26B, it can be separated from the template 302. Different separation states are shown in FIGS. 27A to 27C.

Figure 27A:
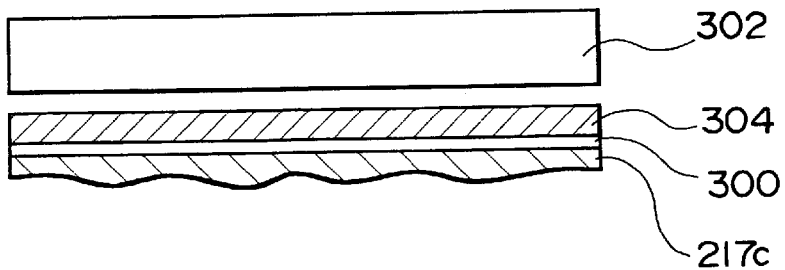
FIGS. 27A to 27C illustrate separation states of the ninth embodiment.

FIG. 27A shows an example in which the bonding forces at the interface between the template 302 and the separation layer 304 are reduced, so that separation occurs at that interface. In this case, it is preferable to wash the assembly, to remove the separation layer 304 from the transparent electrode film 300.

Figure 27B:
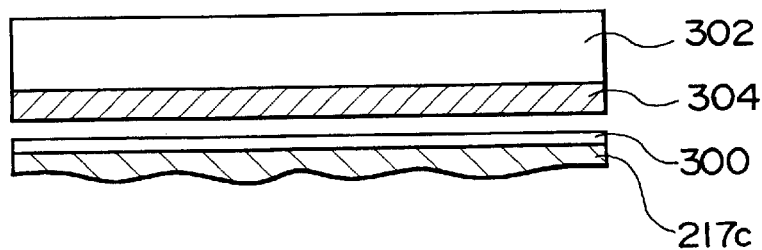

FIG. 27B shows an example in which the bonding forces at the interface between the transparent electrode film 300 and the separation layer 304 are reduced, so that separation occurs at that interface. In this case too, it is preferable to wash the surface of the transparent electrode film 300, because fragments of the separation layer 304 will adhere to the transparent electrode film 300.

Figure 27C:
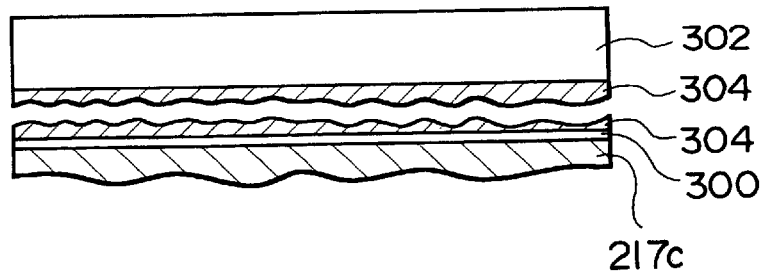

FIG. 27C shows an example in which the bonding forces between molecules or atoms are reduced within the separation layer 304, so separation occurs there. In this case too, it is preferable to wash the assembly, to remove fragments of the separation layer 304 from the transparent elect rode film 300.

Note that the separation state is not limited to the above described three examples; it is also possible for combinations of these separations to occur locally.

Figure 28:
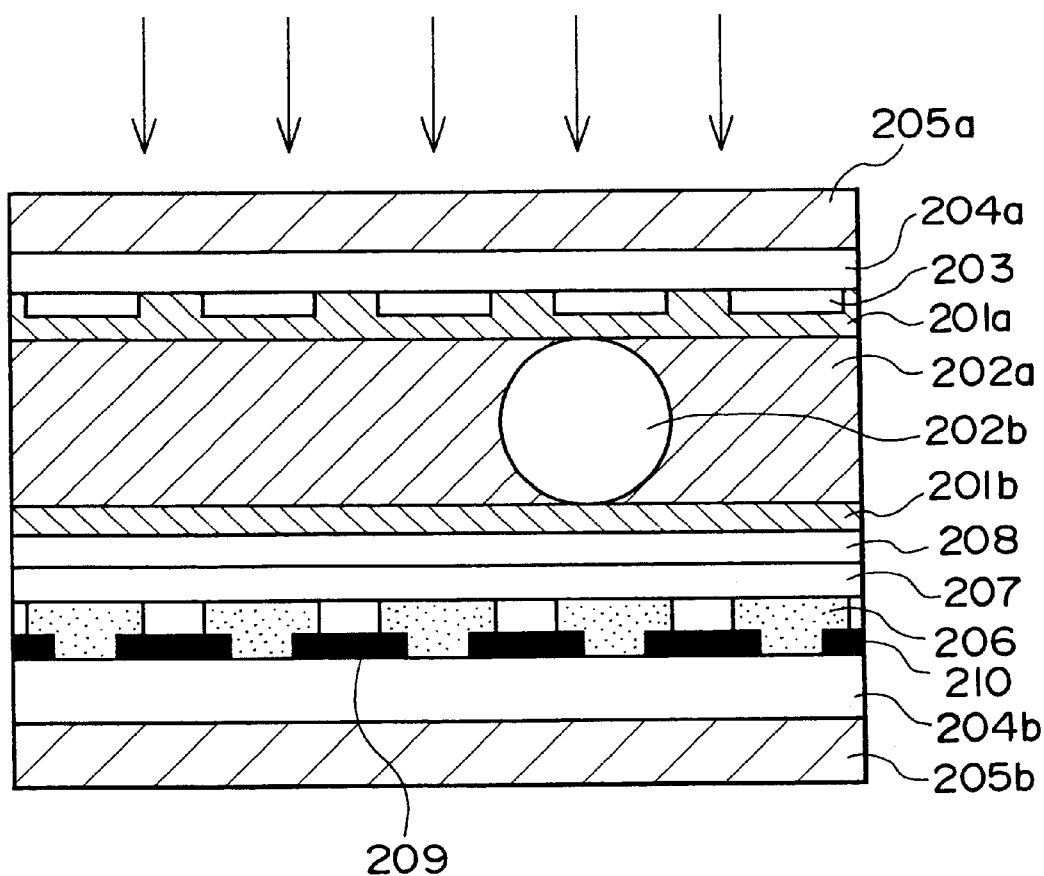
FIG. 28 is a cross-sectional view through a liquid crystal panel.

A cross-sectional view through a thin-film transistor (TFT) color liquid crystal panel that is combined with a color filter 210 is shown in FIG. 28. This color liquid crystal panel is provided with a glass substrate 204a facing the color filter 210, with a liquid crystal compound 202a injected therebetween. The color filter 210 is provided with red (R), green (G), and blue (B) colored layers 206 on a glass substrate 204b to correspond to primary-color display elements of the liquid crystal panel, and is an essential filter for displaying colors by the liquid crystal panel. An opaque layer (black matrix) 209 is formed between the colored layers 206, to improve the contrast and prevent mixing of the coloring materials. A protective layer 207 and a common electrode 208 are formed in sequence on the colored layers 206. Transparent pixel electrodes 203 and TFTs (not shown in the figure) are formed on the matrix on the inner side of the glass substrate 204a. Orientation films 201a and 201b are formed on the inner surfaces of the two glass substrates 204a and 204b, and the liquid crystal molecules can be orientated in fixed directions by subjecting those films to rubbing. Spacers 202b for keeping the cell gap spacing constant are inserted into the region (cell gap) bounded by the orientation films 201a and 201b. Spheres of silica, polystyrene, or the like are used as these spacers 202b. A color display can be achieved by shining a backlight onto this liquid crystal panel and causing the liquid crystal compound 202a to function as an optical shutter that varies the transmissivity of the backlight.

What is claimed is:

1. A method of making a color filters, comprising:
   a first step of fabricating a template having a plurality of protrusions in a predetermined array;
   a second step of transfer-forming an ink filling layer having a plurality of ink filling concavities by causing an ink filling layer precursor to adhere to said template, solidifying said ink filling layer precursor to form said ink filling layer, then separating said ink filling layer from said template, an opaque material being injected into concavities between said protrusions of said template after said first step but before said second step, to form an opaque layer, and said opaque layer being integrated with said ink filling layer in said second step, by using said template on which is formed said opaque layer; and
   a third step of filling said ink filling cavities with ink of previously determined colors, to form a color pattern layer.

2. The method of making a color filter of claim 1, wherein:
   said first step comprises a step of forming a resist layer of a predetermined pattern on a substrate, then forming said protrusions on said substrate by etching to obtain said template.

3. The method of making a color filter of claim 2, wherein:
   said substrate is a silicon wafer.

4. The method of making a color filter of claim 1, wherein.
   said first step comprises a step of forming a resist layer of a predetermined pattern on a base plate, then making said base plate and said resist layer conductive, and further using electrodeposition to deposit metal by an electroplating method to form a metal layer, and finally separating said metal layer from said base plate and said resist layer to obtain said template.

5. The method of making a color filter of claim 1, wherein;
   said ink filling layer precursor used in said second step is a material which can be hardened by application of energy.

6. The method of making a color filter of claim 5, wherein:
   said energy is at least one of light and heat.

7. The method of making a color filter of claim 6, wherein:
   said ink filling layer precursor is a resin which is hardened by ultraviolet rays.

8. The method of making a color filter of claim 1, wherein:
   said ink is injected by an inkjet method in said third step.

9. The method of making a color filter of claim 1, wherein:
   said opaque material is injected by an inkjet method.

10. The method of making a color filter of claim 1, wherein:
    an inner side surface of each of said concavities of said template is formed in a tapered shape in such a manner that area of an aperture portion thereof is larger than area of a base surface thereof.

11. The method of making a color filter of claim 1, wherein:
    each of said concavities of said template is formed in a tapered shape at an aperture edge portion of an inner side surface thereof.

12. A color filter, comprising:
    an ink filling layer having a plurality of ink filling concavities;
    an opaque material integrated with a projecting portion of said ink filling layer; and
    a color pattern layer formed in said ink filling cavities,
    wherein said ink filling layer is formed by causing a template having a plurality of protrusions in a predetermined array to adhere to an ink filling layer precursor, then solidifying said ink filling layer precursor.

* * * * *